US012750794B2

(12) United States Patent
Pan et al.

(10) Patent No.: US 12,750,794 B2
(45) Date of Patent: Sep. 29, 2026

(54) BEAM-BASED CHANNEL ACCESS METHODS AND SYSTEMS FOR SUPPORTING NEW RADIO ABOVE 52.6 GHz

(71) Applicant: INTERDIGITAL PATENT HOLDINGS, INC., Wilmington, DE (US)

(72) Inventors: Kyle Pan, Saint James, NY (US); Allan Tsai, Boonton, NJ (US); Patrick Svedman, Stockholm (SE); Mohamed Awadin, Plymouth Meeting, PA (US); Yifan Li, Conshohocken, PA (US); Guodong Zhang, Woodbury, NY (US); Pascal Adjakple, Great Neck, NY (US); Zhuo Chen, Claymont, DE (US)

(73) Assignee: InterDigital Patent Holdings, Inc., Wilmington, DE (US)

(*) Notice: Subject to any disclaimer, the term of this patent is extended or adjusted under 35 U.S.C. 154(b) by 752 days.

(21) Appl. No.: 18/040,893

(22) PCT Filed: Aug. 5, 2021

(86) PCT No.: PCT/US2021/044776
§ 371 (c)(1),
(2) Date: Feb. 7, 2023

(87) PCT Pub. No.: WO2022/031988
PCT Pub. Date: Feb. 10, 2022

(65) Prior Publication Data

US 2023/0292262 A1 Sep. 14, 2023

Related U.S. Application Data

(60) Provisional application No. 63/062,661, filed on Aug. 7, 2020.

(51) Int. Cl.
*H04W 56/00* (2009.01)
*H04W 74/04* (2009.01)

(52) U.S. Cl.
CPC ......... *H04W 56/001* (2013.01); *H04W 74/04* (2013.01)

(58) Field of Classification Search
None
See application file for complete search history.

(56) References Cited

U.S. PATENT DOCUMENTS

| | | | | |
|---|---|---|---|---|
| 11,368,867 | B2 * | 6/2022 | Kim | H04W 48/16 |
| 2019/0053239 | A1 * | 2/2019 | Zhou | H04L 5/0094 |

(Continued)

FOREIGN PATENT DOCUMENTS

| | | | |
|---|---|---|---|
| WO | 2020/060379 | A1 | 3/2020 |
| WO | 2020/063929 | A1 | 4/2020 |

OTHER PUBLICATIONS

3GPP TR 38.913 Study on Scenarios and Requirements for Next Generation Access Technologies; (Release 14), V14.3.0, 2017, 39 pages.

(Continued)

*Primary Examiner* — Nicholas Sloms
(74) *Attorney, Agent, or Firm* — Flaster Greenberg P.C.

(57) ABSTRACT

Methods for flexible signal and channel transmission for increasing channel access opportunities and mitigating interference for supporting NR from 52.6 GHz and above are disclosed. Indication of RMSI CORESET/PDCCH and PDSCH SCS are proposed. A scheme to improve performance, decrease latency and reduce power consumption is also disclosed. And more efficient rate matching is proposed for the frequency range from 52.6 GHz and above.

10 Claims, 22 Drawing Sheets

(56) References Cited

U.S. PATENT DOCUMENTS

| | | | | |
|---|---|---|---|---|
| 2019/0140776 | A1* | 5/2019 | Seo | H04L 1/0071 |
| 2019/0149383 | A1* | 5/2019 | Ko | H04L 5/0053 370/329 |
| 2019/0150068 | A1* | 5/2019 | Montojo | H04L 5/0046 370/329 |
| 2019/0191457 | A1* | 6/2019 | Si | H04L 5/0053 |
| 2020/0053670 | A1* | 2/2020 | Jung | H04W 56/0015 |
| 2020/0280337 | A1* | 9/2020 | Yi | H04B 1/7143 |
| 2021/0168574 | A1* | 6/2021 | Zhang | H04W 4/40 |
| 2022/0131582 | A1* | 4/2022 | Park | H04W 72/044 |
| 2022/0271894 | A1* | 8/2022 | Li | H04L 5/0048 |
| 2022/0304014 | A1* | 9/2022 | Li | H04L 5/0092 |
| 2023/0224027 | A1* | 7/2023 | Liu | H04W 48/16 375/262 |

OTHER PUBLICATIONS

3GPP TS 38.101-1 User Equipment (UE) radio transmission and reception; Part 1: Range 1 Standalone (Release-16), V16.2.0, 2019, 310 pages.

3GPP TS 38.101-2 User Equipment (UE) radio transmission and reception; Part 2: Range 2 Standalone (Release-16), V16.2.0, 2019, 157 pages.

3GPP TS 38.306 User Equipment (UE) radio access capabilities; (Release 15), V15.3.0, 2018, 31 pages.

Samsung: "Remaining Details On OSI Delivery," 3GPP Draft; RI-1720275 NR Other System Info Delivery, 3rd Generation Partnership Project (3GPP), Mobile Competence Centre, 650, Route Des Lucioles; F-06921 Sophia-Antipolis Cedex; France vol. Ran Wgl, No. Reno, USA; Nov. 27, 2017-De. 1, 2017, Nov. 18, 2017.

* cited by examiner

PRIOR ART

BEAM-BASED CHANNEL ACCESS METHODS AND SYSTEMS FOR SUPPORTING NEW RADIO ABOVE 52.6 GHz

CROSS-REFERENCE TO RELATED APPLICATIONS

This application is the National Stage Application of International Patent Application No. PCT/US2021/044776, filed Aug. 5, 2021, which claims the benefit of U.S. Provisional Patent Application No. 63/062,661, filed on Aug. 7, 2020, entitled "Beam-Based Channel Access Methods And Systems For Supporting New Radio Above 52.6 GHZ," the contents of which are incorporated by reference herein.

BACKGROUND

In order to support a wide range of services, a 5th generation mobile network (5G) New Radio (NR) system aims to be flexible enough to meet the connectivity requirements of a range of existing and future (as yet unknown) services to be deployable in an efficient manner. In particular, NR considers supporting potential use of frequency range up to 100 GHz (ref. TR 38.913).

NR specifications that have been developed in Release 15 (Rel-15) and Release 16 (Rel-16) define operation for frequencies up to 52.6 GHz, where all physical layer channels, signals, procedures, and protocols are designed to be optimized for uses under 52.6 GHz.

However, frequencies above 52.6 GHz are faced with more difficult challenges, such as higher phase noise, larger propagation loss due to high atmospheric absorption, lower power amplifier efficiency, and strong power spectral density regulatory requirements in unlicensed bands, compared to lower frequency bands. Additionally, the frequency ranges above 52.6 GHz potentially contain larger spectrum allocations and larger bandwidths that are not available for bands lower than 52.6 GHz.

SUMMARY

In one aspect, examples for flexible signal and channel transmission for increasing channel access opportunities and mitigating interference for supporting NR from 52.6 GHz and above are disclosed. Due to increased flexibility of transmission, a half radio frame indication could cause ambiguity of a frame boundary and is no longer valid in high Subcarrier Spacing (SCS) scenarios if using a flexible SS burst set or DRS burst transmission. In legacy NR, there is only one such valid time offset. The ambiguity could occur if there is more than one valid time offset relative to the half-frame boundary of a Synchronization Signal (SS) burst set or Discovery Reference Signal (DRS) burst arising from a flexible SS burst set or DRS burst transmission. Examples of flexible signal and channel transmission as well as corresponding timing acquisition are proposed. Examples include changing the DRS burst window, the modification for indication and signaling as well as enhancement for the current mechanism for timing acquisition. One example may design single SCS with high granularity in the time domain. Another example may be to design multiple SCSs with each SCS having independent granularity. This may achieve better flexibility since each SCS may have its own timing granularity and flexibility. Yet another example may include designing multiple SCSs with unified granularity. This may consider the worst case design, which may decrease the level of flexibility but may lower the signaling overhead.

A SS or a Physical Broadcast Channel (PBCH) DeModulation Reference Signal (DMRS) may be used for enabling and indicating flexible transmission. One example may use multiple sets or partitions of SS. Another example may use multiple sets or partitions of PBCH DMRS. Yet another example may use multiple sets or partitions of any combination of the above.

Alternatively, one example may use spare bit (e.g., in a Master Information Block (MIB)) for finer granularity for flexibility of transmission. Another example may use subCarrierSpacingCommon for finer granularity for flexibility of transmission. Yet another example may use pdcch-ConfigSIB1 e.g., Most Significant Bit (MSB) of pdcch-ConfigSIB1 for finer granularity for flexibility of transmission. Yet another example may use any combination of the above.

In another aspect, indications of Remaining Minimum System Information (RMSI) Control Resource Set (CORESET)/Physical Downlink Control Channel (PDCCH) and Physical Downlink Shared Data Channel (PDSCH) SCS are proposed. One example may have multiple SCSs and have implicit association for the SCS of a RMSI CORESET with the SCS of a Synchronization Signal Block (SSB). Another example may be to have an explicit indication for the SCS of a RMSI CORESET. Yet another example may use joint implicit association and explicit indication to indicate RMSI CORESET/PDCCH and PDSCH SCS and reduce signaling overhead.

In another aspect, a scheme is proposed to improve performance, decrease latency and reduce power consumption. The aspect involves SSB repetition procedures, repetition indication and signaling and User Equipment (UE) detection procedures. SSB repetition within the same DRS burst that is quasi co-located (QCL-ed), may improve coherent combining and soft combining gain for the SSB including Primary Synchronization Signal (PSS)/Secondary Synchronization Signal (SSS) detection and PBCH decoding. In addition, beam sweeping may significantly reduce the latency. Furthermore, the example provided above may significantly reduce the power consumption necessary for SSB detection.

Examples of a mechanism to support SSB repetition within the same DRS burst.

One example may be to introduce a repetition indicator for a SS/PBCH block among its corresponding candidate SS/PBCH block index based on:

$$SS/PBCH \text{ block index} = (\bar{i} \bmod N_{SSB}^{QCL}).$$

If repetition indication is enabled, then full repetition may be performed for all candidate SS/PBCH blocks corresponding to the same SS/PBCH block index within the same DRS burst. Otherwise, no repetition may be performed. In addition to SSB repetition within the same DRS burst, SSB repetition may also be performed across DRS bursts. Another example may be to introduce a repetition indicator with additional information for a repetition pattern. If repetition is enabled, then assistance information for which and how the repetition is performed may be indicated to a UE. In an example, partial repetition may be possible. For example, a value for a number of repetitions may be indicated if repetition is "on". Yet another example may be to use a repetition bitmap to indicate the exact repetition that is performed for all candidate SS/PBCH blocks corresponding to the same SS/PBCH block index within the same DRS burst. For example, if the bitmap indicates all "0", then no repetition may be performed. Otherwise, repetition may be performed according to the repetition bitmap.

Another example may be to use multiple sets of SS e.g., PSS and/or SSS for repetition indication. Yet another example may use multiple sets of PBCH DMRS for repetition indication. Yet another example may be to use multiple partitions of SS e.g., PSS and/or SSS for repetition indication. Yet another example may use multiple partitions of PBCH DMRS for repetition indication.

In yet another aspect, more efficient rate matching is described for the frequency range from 52.6 GHz and above. One example may be based on SSB detection by the UE. Another example may use an indication of a SSB transmission pattern or repetition pattern for rate matching purposes. Yet another example may use an indication of a bitmap for rate matching purposes. A QCL-based bitmap may be introduced.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The following detailed description is better understood when read in conjunction with the appended drawings. For the purposes of illustration, examples are shown in the drawings; however, the subject matter is not limited to specific elements and instrumentalities disclosed. In the drawings.

DETAILED DESCRIPTION

Figure 1:
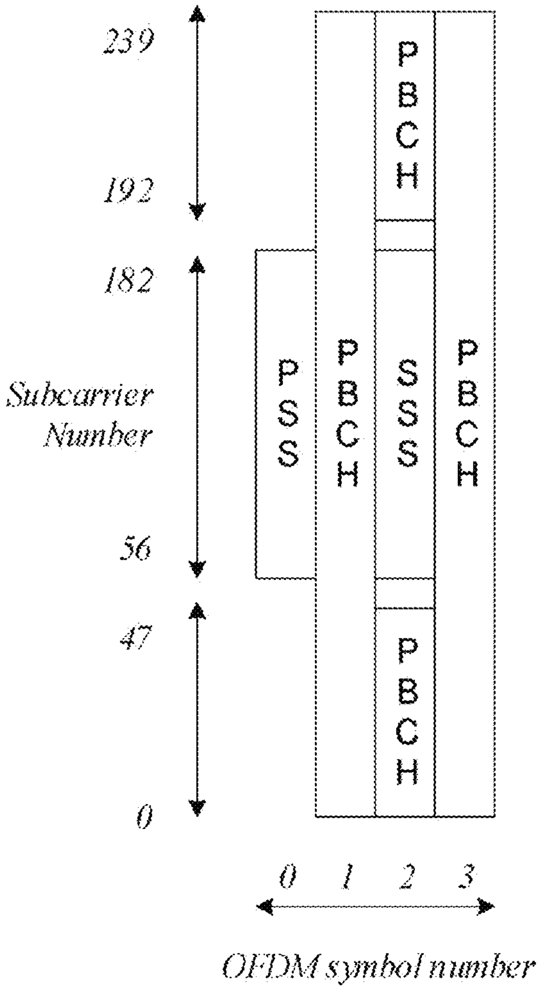
FIG. 1 shows an example time-frequency structure of SSB.

In the following description, the acronyms below may have the following meanings:

A/N Ack/Nack
BRS Beam Reference Signal
BWP Bandwidth Part
CA Carrier aggregation
CBR Channel Busy Ratio
CBW Channel Bandwidth
CCA Clear channel assessment
CE Control Element
COT Channel Occupation Time
CRB Carrier Resource Block
DL Downlink
DMRS DeModulation Reference signal
DRS Discovery Reference Signal
DRX Discontinuous Reception
eMBB enhanced Mobile Broadband
FR1 Frequency Range 1
FR2 Frequency Range 2
FR4 Frequency Range 4
GNSS Global Navigation Satellite System
HARQ Hybrid Automatic Repeat Request
IEEE Institute of Electrical and Electronics Engineers
LAA Licensed-assisted access
LBT Listen Before Talk
LTE Long term Evolution
MAC Medium Access Control
MIB Master Information Block
mMTC massive Machine Type Communication
NACK Non-ACKnowledgement
NR New Radio
NR-U New Radio Unlicensed
PBCH Physical Broadcast Channel
PDCCH Physical Downlink Control Channel
PDSCH Physical Downlink Shared Data Channel PRACH Physical Random Access Channel
PRB Physical Resource Block
PSDCH Physical Sidelink Discovery Channel
PSFCH Physical Sidelink Feedback Channel
PSS Primary Synchronization Signal
PT-RS Phase Tracking Reference Signal
RAN Radio Access Network
RAT Radio Access Technology
RMSI Remaining Minimum System Information
RNTI Radio Network Temporary Identifier
RSTD Reference Signal Timing Difference
RRC Radio Resource Control
SCI Sidelink Control Information
SI System Information
SIB System Information Block
SRS Sounding Reference Signal
SS Synchronization Signal
SSB Synchronization Signal Block
SSS Secondary Synchronization Signal
TCI Transmission Configuration Index
TDD Time Division Duplex
UE User Equipment
UL Uplink
URLLC Ultra-Reliable and Low Latency Communications The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. In several examples, the use cases may include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Examples of services and applications in these categories include, e.g., monitoring and sensor networks, device remote controlling, bi-directional remote controlling, personal cloud computing, video streaming, wireless cloud-based office, first responder connectivity, automotive recall, disaster alerts, real-time gaming, multi-person video calls, autonomous driving, augmented reality, tactile internet, and virtual reality to name a few. All of these use cases and others are contemplated herein.

Figure 21A:
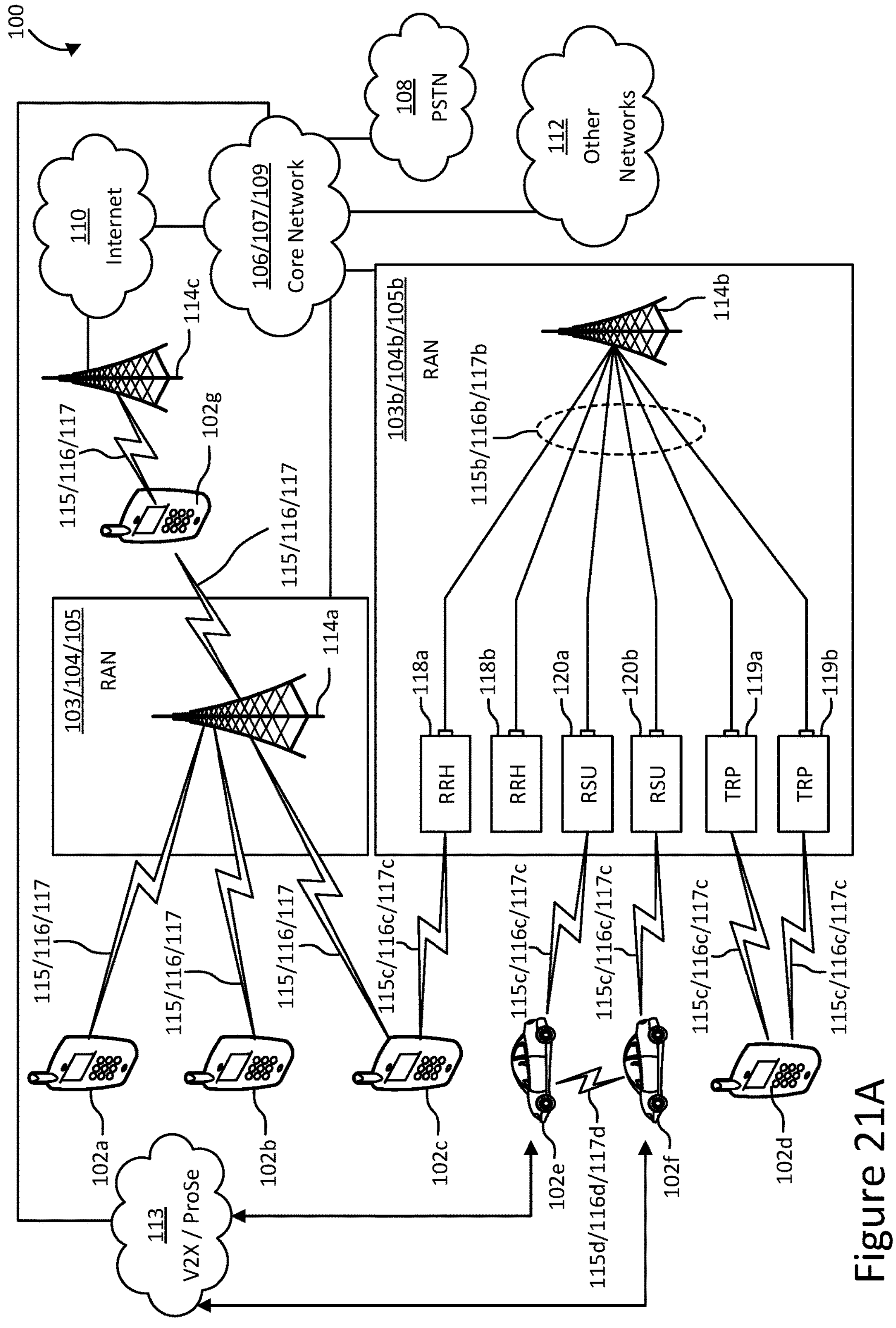
FIG. 21A illustrates an example communications system in which the methods and apparatuses described and claimed herein may be embodied.

FIG. 21A illustrates one embodiment of an example communications system 100 in which the methods and apparatuses described and claimed herein may be embodied. As shown, the example communications system 100 may include wireless transmit/receive units (WTRUs) 102*a*, 102*b*, 102*c*, 102*d*, 102*e*, 102*f*, and/or 102*g* (which generally or collectively may be referred to as WTRU 102), a radio access network (RAN) 103/104/105/103*b*/104*b*/105*b*, a core network 106/107/109, a public switched telephone network (PSTN) 108, the Internet 110, other networks 112, and V2X server (or ProSe function and server) 113, though it will be appreciated that the disclosed embodiments contemplate any number of WTRUs, base stations, networks, and/or network elements. Each of the WTRUs 102*a*, 102*b*, 102*c*, 102*d*, 102*e*, 102*f*, 102*g* may be any type of apparatus or device configured to operate and/or communicate in a wireless environment. Although each WTRU 102*a*, 102*b*, 102*c*, 102*d*, 102*e*, 102*f*, 102*g* is depicted in FIGS. 21A-21E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114*a* and a base station 114*b*. Base stations 114*a* may be any type of device configured to wirelessly interface with at least one of the WTRUs 102*a*, 102*b*, 102*c* to facilitate access to one or more communication networks, such as the core network 106/107/109, the Internet 110, and/or the other networks 112. Base stations 114*b* may be any type of device configured to wiredly and/or wirelessly interface with at least one of the RRHs (Remote Radio Heads) 118*a*, 118*b*, TRPs (Transmission and Reception Points) 119*a*, 119*b*, and/or RSUs (Roadside Units) 120*a* and 120*b* to facilitate access to one or more communication networks, such as the core network 106/107/109, the Internet 110, the other networks 112, and/or V2X server (or ProSe function and server) 113. RRHs 118*a*, 118*b* may be any type of device configured to wirelessly interface with at least one of the WTRU 102*c*, to facilitate access to one or more communication networks, such as the core network 106/107/109, the Internet 110, and/or the other networks 112. TRPs 119*a*, 119*b* may be any type of device configured to wirelessly interface with at least one of the WTRU 102*d*, to facilitate access to one or more communication networks, such as the core network 106/107/109, the Internet 110, and/or the other networks 112. RSUs 120*a* and 120*b* may be any type of device configured to wirelessly interface with at least one of the WTRU 102_e_ or 102_f_, to facilitate access to one or more communication networks, such as the core network 106/107/109, the Internet 110, the other networks 112, and/or V2X server (or ProSe function and server) 113. By way of example, the base stations 114_a_, 114_b_ may be a base transceiver station (BTS), a Node-B, an eNode B, a Home Node B, a Home eNode B, a site controller, an access point (AP), a wireless router, and the like. While the base stations 114_a_, 114_b_ are each depicted as a single element, it will be appreciated that the base stations 114_a_, 114_b_ may include any number of interconnected base stations and/or network elements.

The base station 114_a_ may be part of the RAN 103/104/105, which may also include other base stations and/or network elements (not shown), such as a base station controller (BSC), a radio network controller (RNC), relay nodes, etc. The base station 114_b_ may be part of the RAN 103_b_/104_b_/105_b_, which may also include other base stations and/or network elements (not shown), such as a base station controller (BSC), a radio network controller (RNC), relay nodes, etc. The base station 114_a_ may be configured to transmit and/or receive wireless signals within a particular geographic region, which may be referred to as a cell (not shown). The base station 114_b_ may be configured to transmit and/or receive wired and/or wireless signals within a particular geographic region, which may be referred to as a cell (not shown). The cell may further be divided into cell sectors. For example, the cell associated with the base station 114_a_ may be divided into three sectors. Thus, in an embodiment, the base station 114_a_ may include three transceivers, e.g., one for each sector of the cell. In an embodiment, the base station 114_a_ may employ multiple-input multiple output (MIMO) technology and, therefore, may utilize multiple transceivers for each sector of the cell.

The base stations 114_a_ may communicate with one or more of the WTRUs 102_a_, 102_b_, 102_c_ over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114_b_ may communicate with one or more of the RRHs 118_a_, 118_b_, TRPs 119_a_, 119_b_, and/or RSUs 120_a_ and 120_b_, over a wired or air interface 115_b_/116_b_/117_b_, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115_b_/116_b_/117_b_ may be established using any suitable radio access technology (RAT).

The RRHs 118_a_, 118_b_, TRPs 119_a_, 119_b_ and/or RSUs 120_a_, 120_b_, may communicate with one or more of the WTRUs 102_c_, 102_d_, 102_e_, 102_f_ over an air interface 115_c_/116_c_/117_c_, which may be any suitable wireless communication link (e.g., radio frequency (RF), microwave, infrared (IR), ultraviolet (UV), visible light, cmWave, mmWave, etc.). The air interface 115_c_/116_c_/117_c_ may be established using any suitable radio access technology (RAT).

The WTRUs 102_a_, 102_b_, 102_c_, 102_d_, 102_e_, 102_f_, and/or 102_g_ may communicate with one another over an air interface 115_d_/116_d_/117_d_ (not shown in the figures), which may be any suitable wireless communication link (e.g., radio frequency (RF), microwave, infrared (IR), ultraviolet (UV), visible light, cmWave, mmWave, etc.). The air interface 115_d_/116_d_/117_d_ may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114_a_ in the RAN 103/104/105 and the WTRUs 102_a_, 102_b_, 102_c_, or RRHs 118_a_, 118_b_, TRPs 119_a_, 119_b_ and RSUs 120_a_, 120_b_, in the RAN 103_b_/104_b_/105_b_ and the WTRUs 102_c_, 102_d_, 102_e_, 102_f_, may implement a radio technology such as Universal Mobile Telecommunications System (UMTS) Terrestrial Radio Access (UTRA), which may establish the air interface 115/116/117 or 115_c_/116_c_/117_c_ respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114_a_ and the WTRUs 102_a_, 102_b_, 102_c_, or RRHs 118_a_, 118_b_, TRPs 119_a_, 119_b_, and/or RSUs 120_a_, 120_b_, in the RAN 103_b_/104_b_/105_b_ and the WTRUs 102_c_, 102_d_, may implement a radio technology such as Evolved UMTS Terrestrial Radio Access (E-UTRA), which may establish the air interface 115/116/117 or 115_c_/116_c_/117_c_ respectively using Long Term Evolution (LTE) and/or LTE-Advanced (LTE-A). In the future, the air interface 115/116/117 may implement 3GPP NR technology. The LTE and LTE-A technology includes LTE D2D and V2X technologies and interface (such as Sidelink communications and etc.). The 3GPP NR technology includes NR V2X technologies and interface (such as Sidelink communications and etc.).

In an embodiment, the base station 114_a_ in the RAN 103/104/105 and the WTRUs 102_a_, 102_b_, 102_c_, or RRHs 118_a_, 118_b_, TRPs 119_a_, 119_b_ and/or RSUs 120_a_, 120_b_, in the RAN 103_b_/104_b_/105_b_ and the WTRUs 102_c_, 102_d_, 102_e_, 102_f_ may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114_c_ in FIG. 21A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114_c_ and the WTRUs 102_e_, may implement a radio technology such as IEEE 802.11 to establish a wireless local area network (WLAN). In an embodiment, the base station 114_c_ and the WTRUs 102_d_, may implement a radio technology such as IEEE 802.15 to establish a wireless personal area network (WPAN). In yet another embodiment, the base station 114_c_ and the WTRUs 102_e_, may utilize a cellular-based RAT (e.g., WCDMA, CDMA2000, GSM, LTE, LTE-A, etc.) to establish a picocell or femtocell. As shown in FIG. 21A, the base station 114_b_ may have a direct connection to the Internet 110. Thus, the base station 114_c_ may not be required to access the Internet 110 via the core network 106/107/109.

The RAN 103/104/105 and/or RAN 103_b_/104_b_/105_b_ may be in communication with the core network 106/107/109, which may be any type of network configured to provide voice, data, applications, and/or voice over internet protocol (VoIP) services to one or more of the WTRUs 102_a_, 102_b_, 102_c_, 102_d_. For example, the core network 106/107/109 may provide call control, billing services, mobile location-based services, pre-paid calling, Internet connectivity, video distribution, etc., and/or perform high-level security functions, such as user authentication.

Although not shown in FIG. 21A, it will be appreciated that the RAN 103/104/105 and/or RAN 103*b*/104*b*/105*b* and/or the core network 106/107/109 may be in direct or indirect communication with other RANs that employ the same RAT as the RAN 103/104/105 and/or RAN 103*b*/104*b*/105*b* or a different RAT. For example, in addition to being connected to the RAN 103/104/105 and/or RAN 103*b*/104*b*/105*b*, which may be utilizing an E-UTRA radio technology, the core network 106/107/109 may also be in communication with another RAN (not shown) employing a GSM radio technology.

The core network 106/107/109 may also serve as a gateway for the WTRUs 102*a*, 102*b*, 102*c*, 102*d*, 102*e* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103*b*/104*b*/105*b* or a different RAT.

Some or all of the WTRUs 102*a*, 102*b*, 102*c*, 102*d* in the communications system 100 may include multi-mode capabilities, e.g., the WTRUs 102*a*, 102*b*, 102*c*, 102*d*, and 102*e* may include multiple transceivers for communicating with different wireless networks over different wireless links. For example, the WTRU 102*e* shown in FIG. 21A may be configured to communicate with the base station 114*a*, which may employ a cellular-based radio technology, and with the base station 114*c*, which may employ an IEEE 802 radio technology.

Figure 21B:
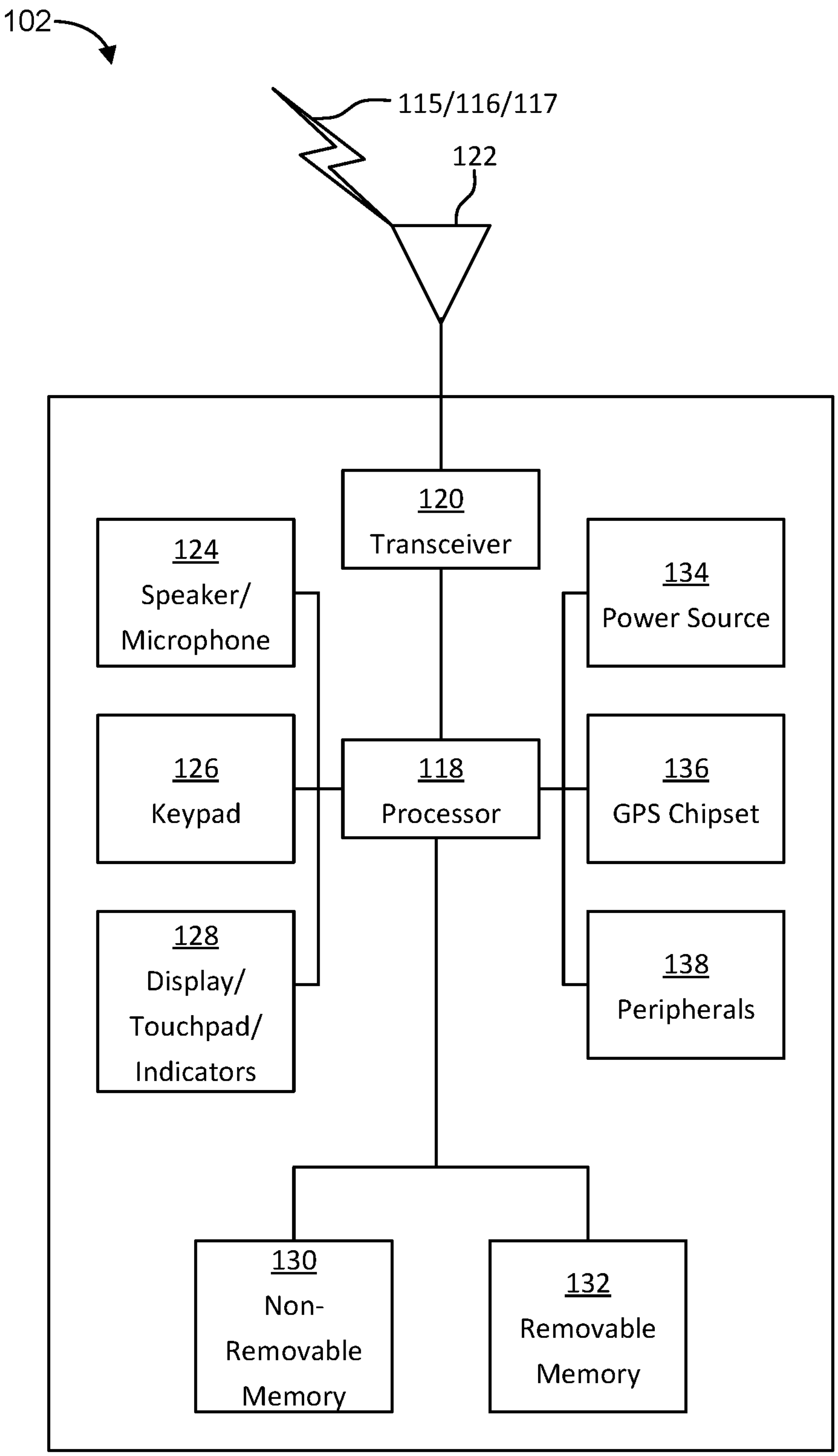
FIG. 21B is a block diagram of an example apparatus or device configured for wireless communications.

FIG. 21B is a block diagram of an example apparatus or device configured for wireless communications in accordance with the embodiments illustrated herein, such as for example, a WTRU 102. As shown in FIG. 21B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114*a* and 114*b*, and/or the nodes that base stations 114*a* and 114*b* may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 21B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 21B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 21B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 21C:
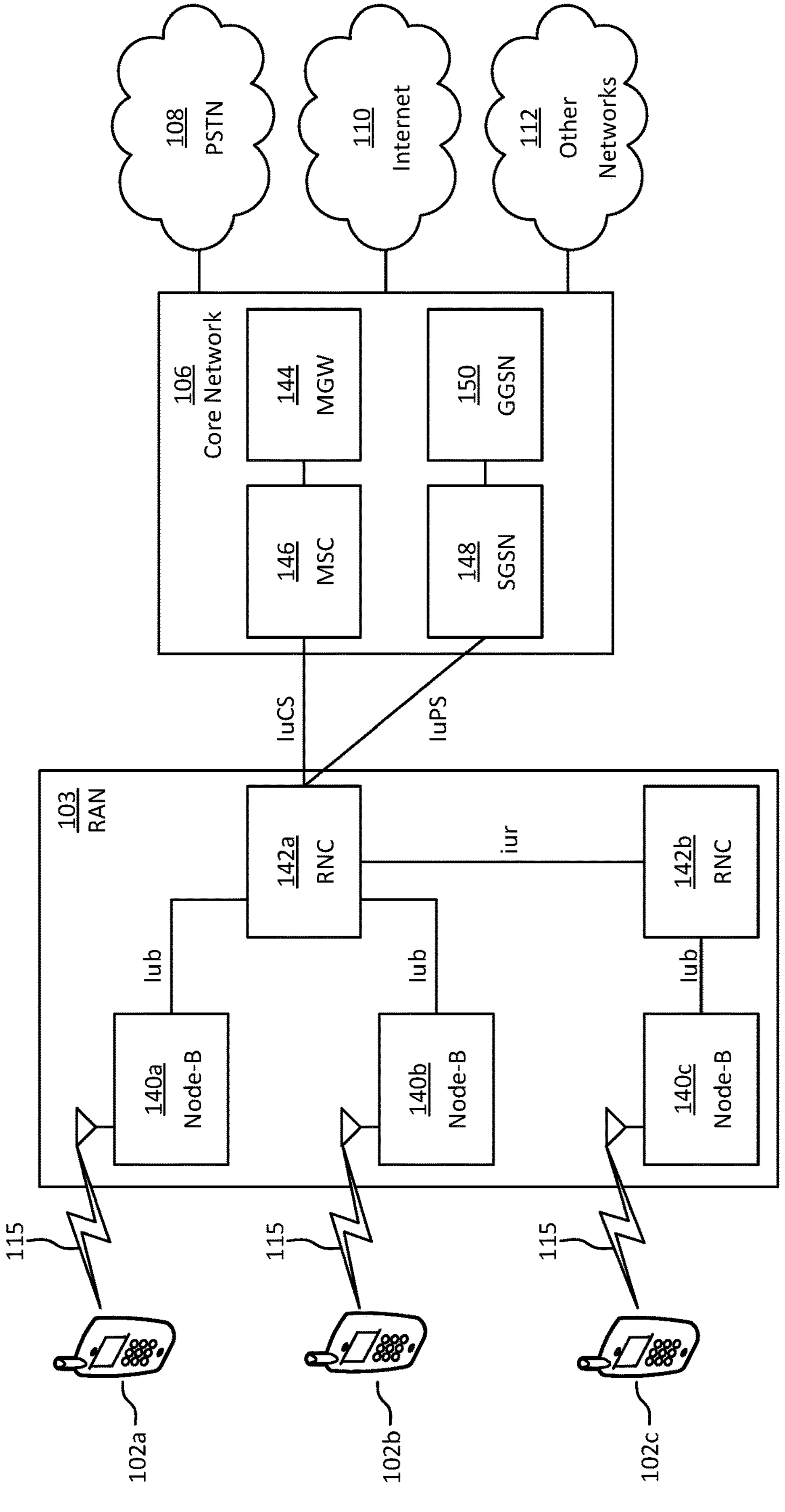
FIG. 21C is a system diagram of an example radio access network (RAN) and core network.

FIG. 21C is a system diagram of the RAN 103 and the core network 106 according to an embodiment. As noted above, the RAN 103 may employ a UTRA radio technology to communicate with the WTRUs 102*a*, 102*b*, and 102*c* over the air interface 115. The RAN 103 may also be in communication with the core network 106. As shown in FIG. 21C, the RAN 103 may include Node-Bs 140*a*, 140*b*, 140*c*, which may each include one or more transceivers for communicating with the WTRUs 102*a*, 102*b*, 102*c* over the air interface 115. The Node-Bs 140*a*, 140*b*, 140*c* may each be associated with a particular cell (not shown) within the RAN 103. The RAN 103 may also include RNCs 142*a*, 142*b*. It will be appreciated that the RAN 103 may include any number of Node-Bs and RNCs while remaining consistent with an embodiment.

As shown in FIG. 21C, the Node-Bs 140*a*, 140*b* may be in communication with the RNC 142*a*. Additionally, the Node-B 140*c* may be in communication with the RNC 142*b*. The Node-Bs 140*a*, 140*b*, 140*c* may communicate with the respective RNCs 142*a*, 142*b* via an Tub interface. The RNCs 142*a*, 142*b* may be in communication with one another via an Iur interface. Each of the RNCs 142*a*, 142*b* may be configured to control the respective Node-Bs 140*a*, 140*b*, 140*c* to which it is connected. In addition, each of the RNCs 142*a*, 142*b* may be configured to carry out or support other functionality, such as outer loop power control, load control, admission control, packet scheduling, handover control, macro-diversity, security functions, data encryption, and the like.

The core network 106 shown in FIG. 21C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142*a* in the RAN 103 may be connected to the MSC 146 in the core network 106 via an IuCS interface. The MSC 146 may be connected to the MGW 144. The MSC 146 and the MGW 144 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices.

The RNC 142*a* in the RAN 103 may also be connected to the SGSN 148 in the core network 106 via an IuPS interface. The SGSN 148 may be connected to the GGSN 150. The SGSN 148 and the GGSN 150 may provide the WTRUs 102*a*, 102*b*, 102*c* with access to packet-switched networks, such as the Internet 110, to facilitate communications between and the WTRUs 102*a*, 102*b*, 102*c* and IP-enabled devices.

As noted above, the core network 106 may also be connected to the networks 112, which may include other wired or wireless networks that are owned and/or operated by other service providers.

Figure 21D:
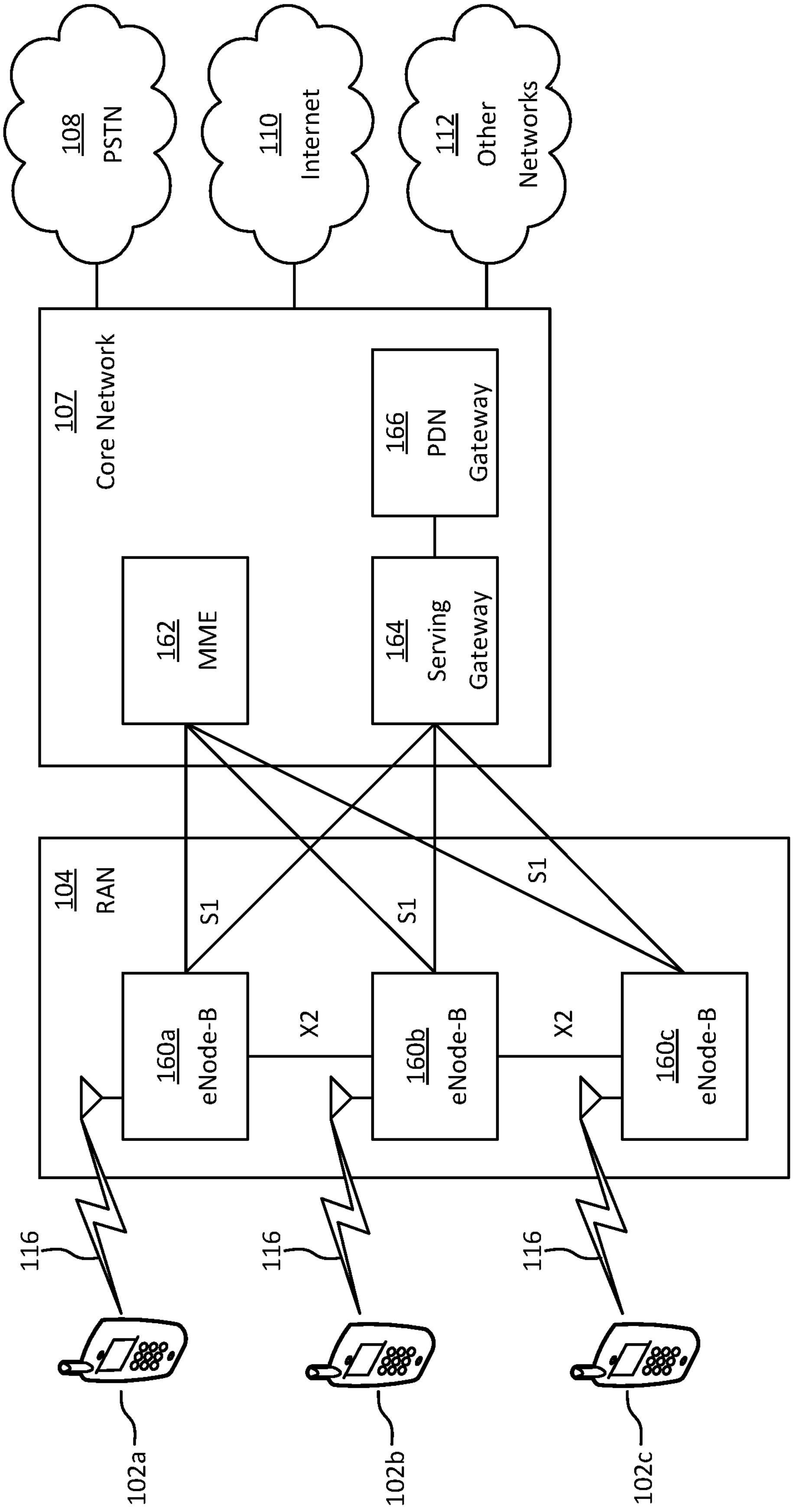
FIG. 21D is a system diagram of another example RAN and core network.

FIG. 21D is a system diagram of the RAN 104 and the core network 107 according to an embodiment. As noted above, the RAN 104 may employ an E-UTRA radio technology to communicate with the WTRUs 102*a*, 102*b*, and 102*c* over the air interface 116. The RAN 104 may also be in communication with the core network 107.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In an embodiment, the eNode-Bs 160*a*, 160*b*, 160*c* may implement MIMO technology. Thus, the eNode-B 160*a*, for example, may use multiple antennas to transmit wireless signals to, and receive wireless signals from, the WTRU 102*a*.

Each of the eNode-Bs 160*a*, 160*b*, and 160*c* may be associated with a particular cell (not shown) and may be configured to handle radio resource management decisions, handover decisions, scheduling of users in the uplink and/or downlink, and the like. As shown in FIG. 21D, the eNode-Bs 160*a*, 160*b*, 160*c* may communicate with one another over an X2 interface.

The core network 107 shown in FIG. 21D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160*a*, 160*b*, and 160*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160*a*, 160*b*, and 160*c* in the RAN 104 via the S1 interface. The serving gateway 164 may generally route and forward user data packets to/from the WTRUs 102*a*, 102*b*, 102*c*. The serving gateway 164 may also perform other functions, such as anchoring user planes during inter-eNode B handovers, triggering paging when downlink data is available for the WTRUs 102*a*, 102*b*, 102*c*, managing and storing contexts of the WTRUs 102*a*, 102*b*, 102*c*, and the like.

The serving gateway 164 may also be connected to the PDN gateway 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The core network 107 may facilitate communications with other networks. For example, the core network 107 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102*a*, 102*b*, 102*c* with access to the networks 112, which may include other wired or wireless networks that are owned and/or operated by other service providers.

Figure 21E:
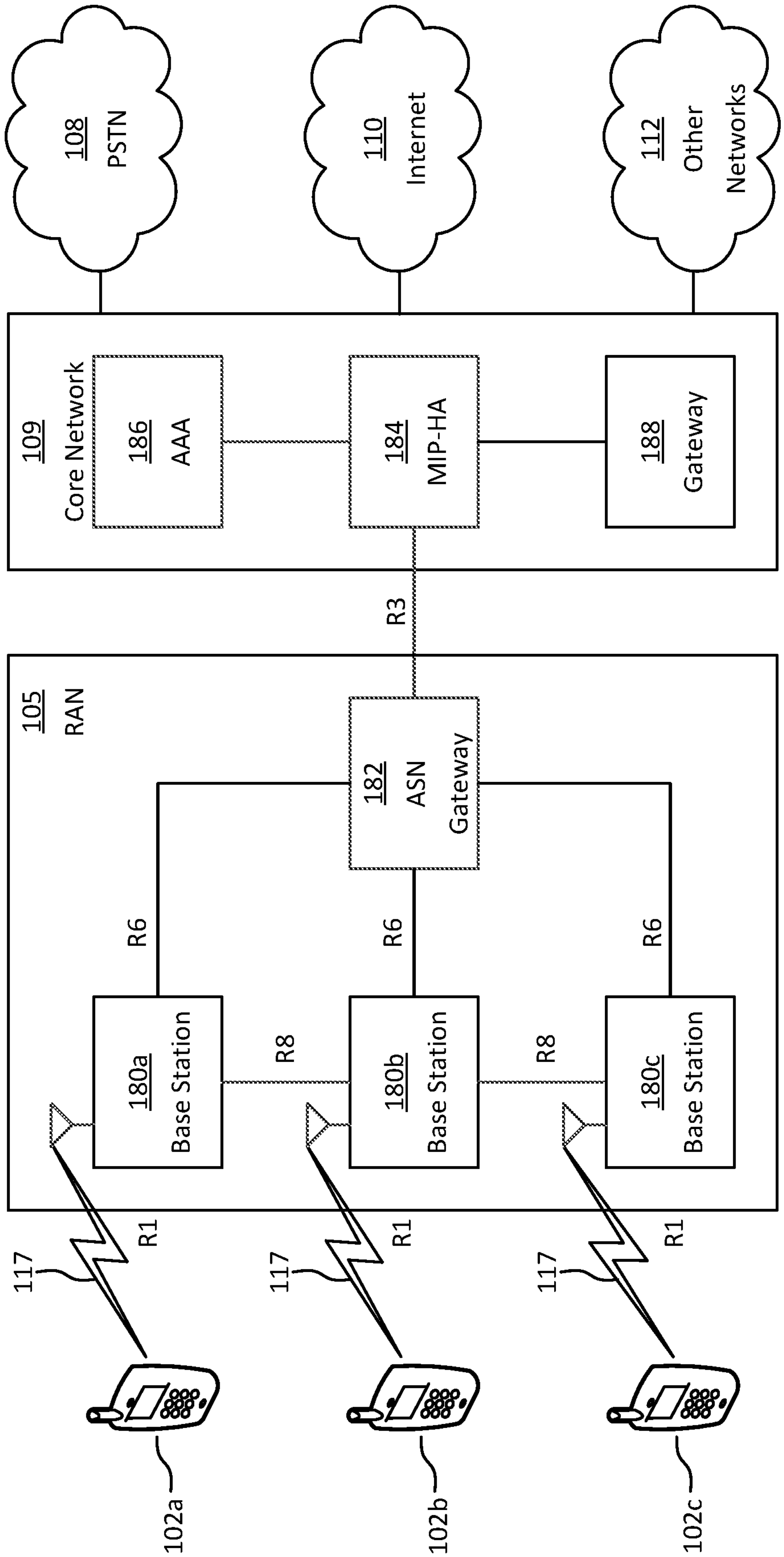
FIG. 21E is a system diagram of another example RAN and core network.

FIG. 21E is a system diagram of the RAN 105 and the core network 109 according to an embodiment. The RAN 105 may be an access service network (ASN) that employs IEEE 802.16 radio technology to communicate with the WTRUs 102*a*, 102*b*, and 102*c* over the air interface 117. As will be further discussed below, the communication links between the different functional entities of the WTRUs 102*a*, 102*b*, 102*c*, the RAN 105, and the core network 109 may be defined as reference points.

As shown in FIG. 21E, the RAN 105 may include base stations 180*a*, 180*b*, 180*c*, and an ASN gateway 182, though it will be appreciated that the RAN 105 may include any number of base stations and ASN gateways while remaining consistent with an embodiment. The base stations 180*a*, 180*b*, 180*c* may each be associated with a particular cell in the RAN 105 and may include one or more transceivers for communicating with the WTRUs 102*a*, 102*b*, 102*c* over the air interface 117. In an embodiment, the base stations 180*a*, 180*b*, 180*c* may implement MIMO technology. Thus, the base station 180*a*, for example, may use multiple antennas to transmit wireless signals to, and receive wireless signals from, the WTRU 102*a*. The base stations 180*a*, 180*b*, 180*c* may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102*a*, 102*b*, 102*c* and the RAN 105 may be defined as an R1 reference point that implements the IEEE 802.16 specification. In addition, each of the WTRUs 102*a*, 102*b*, and 102*c* may establish a logical interface (not shown) with the core network 109. The logical interface between the WTRUs 102*a*, 102*b*, 102*c* and the core network 109 may be defined as an R2 reference point, which may be used for authentication, authorization, IP host configuration management, and/or mobility management.

The communication link between each of the base stations 180*a*, 180*b*, and 180*c* may be defined as an R8 reference point that includes protocols for facilitating WTRU handovers and the transfer of data between base stations. The communication link between the base stations 180*a*, 180*b*, 180*c* and the ASN gateway 182 may be defined as an R6 reference point. The R6 reference point may include protocols for facilitating mobility management based on mobility events associated with each of the WTRUs 102*a*, 102*b*, 102*c*.

As shown in FIG. 21E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102*a*, 102*b*, and 102*c* to roam between different ASNs and/or different core networks. The MIP-HA 184 may provide the WTRUs 102*a*, 102*b*, 102*c* with access to packet-switched networks, such as the Internet 110, to facilitate communications between the WTRUs 102*a*, 102*b*, 102*c* and IP-enabled devices. The AAA server 186 may be responsible for user authentication and for supporting user services. The gateway 188 may facilitate interworking with other networks. For example, the gateway 188 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. In addition, the gateway 188 may provide the WTRUs 102*a*, 102*b*, 102*c* with access to the networks 112, which may include other wired or wireless networks that are owned and/or operated by other service providers.

Although not shown in FIG. 21E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102*a*, 102*b*, 102*c* between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 21A, 21C, 21D, and 21E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 21A, 21B, 21C, 21D, and 21E are provided by way of example only, and it is understood that the subject matter disclosed and claimed herein may be embodied or implemented in any similar communication system, whether presently defined or defined in the future.

Figure 21F:
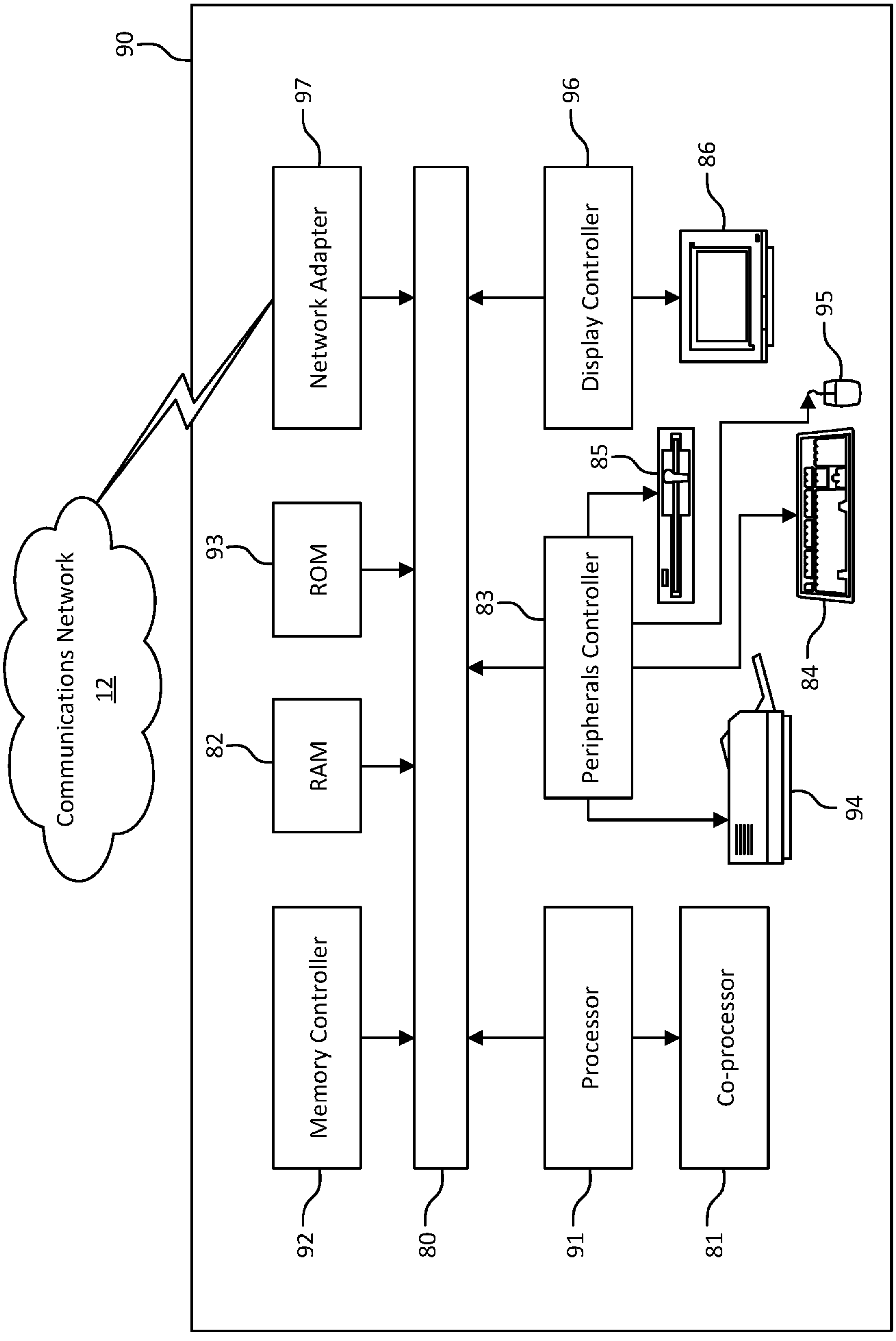
FIG. 21F is a block diagram of an example computing system.

FIG. 21F is a block diagram of an exemplary computing system 90 in which one or more apparatuses of the communications networks illustrated in FIGS. 21A, 21C, 21D and 21E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 21A, 21B, 21C, 21D, and 21E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

Figure 21G:
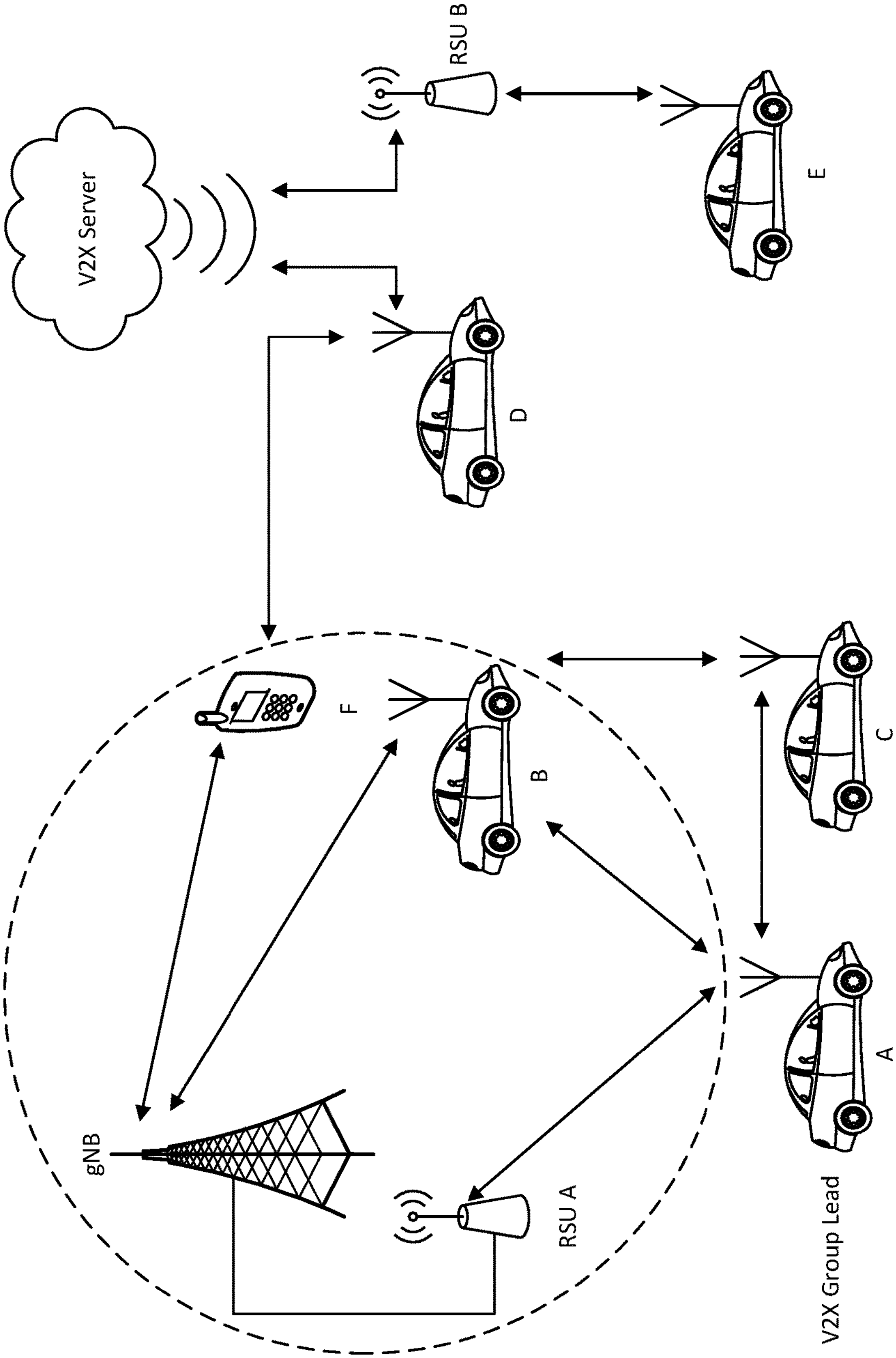
FIG. 21G is a block diagram of another example communications system.

FIG. 21G illustrates one embodiment of an example communications system 111 in which the methods and apparatuses described and claimed herein may be embodied. As shown, the example communications system 111 may include wireless transmit/receive units (WTRUs) A, B, C, D, E, F, a base station, a V2X server, and a RSUs A and B, though it will be appreciated that the disclosed embodiments contemplate any number of WTRUs, base stations, networks, and/or network elements. One or several or all WTRUs A, B, C, D, E can be out of range of the network (for example, in the figure out of the cell coverage boundary shown as the dash line). WTRUs A, B, C form a V2X group, among which WTRU A is the group lead and WTRUs B and C are group members. WTRUs A, B, C, D, E, F may communicate over Uu interface or Sidelink (PC5) interface.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

By way of further background, in order to support wide range of services, 5G NR system aims to be flexible enough to meet the connectivity requirements of a range of existing and future (as yet unknown) services to be deployable in an efficient manner. In particular, NR considers supporting potential use of frequency range up to 100 GHz (ref. TR 38.913).

NR specifications that have been developed in Rel-15 and Rel-16 define operation for frequencies up to 52.6 GHz, where all physical layer channels, signals, procedures, and protocols are designed to be optimized for uses under 52.6 GHz.

However, frequencies above 52.6 GHz are faced with more difficult challenges, such as higher phase noise, larger propagation loss due to high atmospheric absorption, lower power amplifier efficiency, and strong power spectral density regulatory requirements in unlicensed bands, compared to lower frequency bands. Additionally, the frequency ranges above 52.6 GHz potentially contain larger spectrum allocations and larger bandwidths that are not available for bands lower than 52.6 GHz.

As an initial effort to enable and optimize 3GPP NR system for operation in above 52.6 GHz, 3GPP RAN has studied requirements for NR beyond 52.6 GHz up to 114.25 GHz including global spectrum availability and regulatory requirements (including channelization and licensing regimes), potential use cases and deployment scenarios, and NR system design requirements and considerations on top of regulatory requirements (ref. TR 38.807). Examples of the potential use cases identified in the study include high data rate eMBB, mobile data offloading, short range high-data rate D2D communications, broadband distribution networks, integrated access backhaul (IAB), factory automation, industrial IoT (IIoT), wireless display transfer, augmented reality (AR)/virtual reality (VR) wearables, intelligent transport systems (ITS) and V2X, data center inter-rack connectivity, smart grid automation, private networks, and support of high positioning accuracy. These example use cases span over several deployment scenarios identified in the study. The deployment scenarios include, but not limited to, indoor hotspot, dense urban, urban micro, urban macro, rural, factor hall, and indoor D2D scenarios. The study also identified several system design requirements around waveform, MIMO operation, device power consumption, channelization, bandwidth, range, availability, connectivity, spectrum regime considerations, and others.

Among the frequencies of interest, frequencies between 52.6 GHz and 71 GHz are especially interesting relatively in the short term because of their proximity to sub-52.6 GHz for which the current NR system is optimized and the imminent commercial opportunities for high data rate communications, e.g., unlicensed spectrum but also licensed spectrum between 57 GHz and 71 GHz.

Embodiments disclosed herein address the following objectives:

- Required changes to NR using existing DL/UL NR waveform to support operation between 52.6 GHz and 71 GHz
  - Applicable numerology including subcarrier spacing, channel BW (including maximum BW), and their impact to FR2 physical layer design to support system functionality considering practical RF impairments [RAN1, RAN4].
  - Potential critical problems to physical signal/channels, if any [RAN1].
- Channel access mechanisms, considering potential interference to/from other nodes, assuming beam based operation, in order to comply with the regulatory requirements applicable to unlicensed spectrum for frequencies between 52.6 GHz and 71 GHz [RAN1]. In one aspect, potential interference impact, if identified, may require interference mitigation as part of the channel access mechanism.

NR Rel-15 defined two frequency ranges for operation: 1) FR1 spanning from 410 MHz to 7.125 GHz, and 2) FR2 spanning from 24.25 GHz to 52.6 GHz Additionally, NR beyond 52.6 GHz is largely available in the 52.6 GHz to 71 GHz range, most notably in the form of the original 60 GHz band (57-66 GHz) and extended 60 GHz band (57-71 GHz). Moreover, the 66-71 GHz frequency range is available for IMT operation in certain regions.

The proximity of this frequency range (57-71 GHz) to FR2 and the imminent commercial opportunities for high data rate communications makes it compelling to address NR operation in this frequency range.

In order to minimize the specification burden and maximize the leverage of FR2 based implementations, 3GPP has decided to extend FR2 operation up to 71 GHz with the adoption of one or more new numerologies (i.e., larger subcarrier spacings). That or those new numerologies will be identified by the study on waveform for NR>52.6 GHz. NR-U defined procedures for operation in unlicensed spectrum will also be leveraged towards operation in the unlicensed 60 GHz band.

According to embodiments described for Supporting NR above 52.6 GHz and leveraging FR2 design to the extent possible, NR operation extends up to 71 GHz considering, both, licensed and unlicensed operation, with the following objectives:

Physical layer aspects including [RAN1]:

- New numerology or numerologies ($\mu$ value in 38.211) for operation in this frequency range. Addressing impact on physical signals/channels.
- Time line related aspects adapted to each of the new numerologies, e.g., BWP and beam switching times, HARQ scheduling, UE processing, preparation and computation times for PDSCH, PUSCH/SRS and Channel State Information (CSI), respectively.
- Support of up to 64 SSB beams for licensed and unlicensed operation in this frequency range.

Physical layer procedure(s) including [RAM]:

- Channel access mechanism assuming beam based operation in order to comply with the regulatory requirements applicable to unlicensed spectrum for frequencies between 52.6 GHz and 71 GHz.

Radio interface protocol architecture and procedures [RAN2]:

- For operation in unlicensed spectrum in this frequency range: Protocol aspects, as required, to specify the channel access mechanism for unlicensed operation in this frequency range.

Core specifications for UE, gNB and RRM requirements [RAN4]:

- Specify new band(s) for the frequency range from 52.6 GHz-71 GHz. The band(s) definition should include UL/DL operation and excludes ITS spectrum in this frequency range.
- Specify gNB and UE RF core requirements for the band(s) in the above frequency range, including a limited set of example band combinations (see Note 1).

Specify RRM/RLM core requirements.

Similar to regular NR and NR-U operations below 52.6 GHz, NR/NR-U operation in the 52.6 GHz to 71 GHz can be in stand-alone or aggregated via CA or DC with an anchor carrier.

In Release-16 New Radio Unlicensed (NR-U), the supported numerology (i.e., SCS) can be set as, in an example, 15, 30 and 60 KHz. respectively. The listen before talk (LBT) bandwidth may be set to 20 MHz. Based on the minimum LBT bandwidth that may be supported, the DL initial BWP may be 20 MHz. The maximum supported channel bandwidth may be set to 100 MHz. The UE channel bandwidth (or an activated BWP) can be set, in one example, as an integer multiple of LBT bandwidth (i.e. 20 MHz). For instance, for SCS=30 KHz, the total allocated PRB numbers for 20 MHz, 40 MHz and 80 MHz bandwidth may be equal to 48, 102, and 214, respectively.

In Release-16 NR-U, the PRBs allocated by frequencyDomainResources in the CORESET configuration may be confined within one of LBT bandwidths within the BWP corresponding to the CORESET. In this way, a PDCCH may be confined within an LBT bandwidth in order to avoid partial puncturing of a DCI. In one example, a UE can stop monitoring PDCCH searching spaces on LBT bandwidth not available after acquiring the knowledge of transmitted LBT bandwidth(s) from GC-PDCCH. Within the search space set configuration associated with the CORESET, each of the one or more monitoring locations in the frequency domain may correspond to (and may be confined within) an LBT bandwidth and may have a frequency domain resource allocation pattern that is replicated from the pattern configured in the CORESET. In this way, CORESET parameters other than frequency domain resource allocation pattern can be identical for each of the one or more monitoring locations in the frequency domain.

Cell search is the procedure for a UE to acquire time and frequency synchronization with a cell and to detect the physical layer Cell ID of the cell. A UE receives the following synchronization signals (SS) in order to perform cell search using the primary synchronization signal (PSS) and secondary synchronization signal (SSS).

In one aspect, a UE assumes that reception occasions of a physical broadcast channel (PBCH), PSS, and SSS are in consecutive symbols and form a SS/PBCH block. The UE assumes that SSS, PBCH DM-RS, and PBCH data have same EPRE. The UE may assume that the ratio of PSS EPRE to SSS EPRE in a SS/PBCH block is either 0 dB or 3 dB. If the UE has not been provided dedicated higher layer parameters, the UE may assume that the ratio of PDCCH DMRS EPRE to SSS EPRE is within −8 dB and 8 dB when the UE monitors PDCCHs for a DCI format 1_0 with CRC scrambled by SI-RNTI, P-RNTI, or RA-RNTI.

In one example, for a half frame with SS/PBCH blocks, the first symbol indexes for candidate SS/PBCH blocks are determined according to the SCS of SS/PBCH blocks as follows, where index 0 corresponds to the first symbol of the first slot in a half-frame.

The candidate SS/PBCH blocks in a half frame may be indexed in an ascending order in time from 0 to $\bar{L}_{max}-1$, where $L_{max}$ is a maximum number of SS/PBCH block indexes in a cell, and the maximum number of transmitted SS/PBCH blocks within a half frame is $L_{max}$.

For operation without shared spectrum channel access, $L_{max}=\bar{L}_{max}$

For operation with shared spectrum channel access, $L_{max}=8$ for $\bar{L}_{max}=10$ and 15 kHz SCS of SS/PBCH blocks and for $\bar{L}_{max}=20$ and 30 kHz SCS of SS/PBCH blocks In one aspect, the Synchronization Signal and PBCH block (SSB) consists of primary and secondary synchronization signals (PSS, SSS), each occupying 1 symbol and 127 subcarriers, and PBCH spanning across 3 OFDM symbols and 240 subcarriers, but on one symbol leaving an unused part in the middle for SSS. The possible time locations of SSBs within a half-frame are determined by sub-carrier spacing and the periodicity of the half-frames where SSBs are transmitted is configured by the network. During a half-frame, different SSBs may be transmitted in different spatial directions (i.e. using different beams, spanning the coverage area of a cell).

Within the frequency span of a carrier, multiple SSBs can be transmitted. The PCIs of SSBs transmitted in different frequency locations do not have to be unique, i.e. different SSBs in the frequency domain can have different PCIs. However, when an SSB is associated with an RMSI, the SSB corresponds to an individual cell, which has a unique NR Cell Global Identifier. Such an SSB is referred to as a Cell-Defining SSB (CD-SSB). A Primary Cell may be associated to a CD-SSB located on the synchronization raster. Polar coding may be used for PBCH. The UE may assume a band-specific sub-carrier spacing for the SSB unless a network has configured the UE to assume a different sub-carrier spacing. In one aspect, PBCH symbols carry its own frequency-multiplexed DMRS. In one example, quadrature phase shift keying modulation is used for PBCH.

When receiving the PDSCH scheduled with SI-RNTI and the system information indicator in DCI is set to 0, the UE may assume that no SS/PBCH block is transmitted in resource elements used by the UE for a reception of the PDSCH.

When receiving the PDSCH scheduled with SI-RNTI and the system information indicator in DCI is set to 1, RA-RNTI, MsgB-RNTI, P-RNTI or TC-RNTI, the UE may assume SS/PBCH block transmission according to ssb-PositionsInBurst, and if the PDSCH resource allocation overlaps with PRBs containing SS/PBCH block transmission resources the UE may assume that the PRBs containing SS/PBCH block transmission resources are not available for PDSCH in the OFDM symbols where SS/PBCH block is transmitted.

For operation with shared spectrum channel access, SS/PBCH block transmission according to ssb-PositionsInBurst represents all of the candidate SS/PBCH blocks corresponding to SS/PBCH block indices provided by ssb-PositionsInBurst.

The following problem are addressed by the methods, systems, and apparatus described herein:

Problem Statement (Flexible SSB Scheme)

The following is considered for frequency range from 52.6 GHz and above: potential impacts to PHY due to the candidate numerology. The impacts to PHY channels and procedures, such as initial access, UL/DL signal/channel, etc. are considered. In addition, channel access and interference mitigation for 60 GHz unlicensed NR operation are presented.

The higher SCS could enable more flexible transmission for signal and channel access due to an additional degree of freedom in time domain. The higher SCS may also have an impact on channel access opportunities due to shorter a transmission window. In addition, higher SCS may have an impact on interference mitigation due to shorter time duration. More flexible signal and channel transmissions are possible due to higher SCS and shorter transmission time duration.

In NR and NR-U, SS burst set or DRS burst may be confined within 5 ms in FR1/FR2 for SCS up to 240 KHz. 5 ms may comprise a half radio frame. In NR and NR-U the half radio frame indicator may be used for frame boundary synchronization. For NR supporting from 52.6 GHz and above, higher SCS such as SCS 240 KHz, 480 KHz, 960 KHz, 1920 KHz, etc., may be candidate SCS to be supported in a frequency range from 52.6 GHz and above. An SS burst set or DRS burst may be confined within a much shorter time window in frequency range from 52.6 GHz and above due to a higher supported SCS. This could create at least one additional degree of freedom in a time domain for the SS burst set or DRS burst transmission.

This may increase flexibility for signal/channel transmission, increase channel access opportunities and mitigate interference, however timing could be more ambiguous resulting from such flexibility. Thus, there is a need to design a scheme for flexible transmission of signal and channel access and increase channel access opportunities and mitigate interference, while still maintaining accurate timing acquisition for such a flexible signal and channel access scheme.

Problem Statement (RMSI CORESET SCS Indication/Multiplexing)

For NR, larger SCS such as SCS 480 KHz, 960 KHz, 1920 KHz, and etc., may be candidate SCSs to be supported in a frequency range from 52.6 GHz and above.

Problem Statement (Coverage)

In one NR example, the UE assumes that within a discovery burst transmission window, the number of transmitted SS/PBCH blocks on a serving cell is not larger than $$N_{SSB}^{QCL}.$$

In addition, the UE may assume that within a discovery burst transmission window the number of transmitted SS/PBCH blocks with a same SS/PBCH block index is not larger than one. This implies that current NR release does not support SSB repetition within the DRS burst. For example, if $$N_{SSB}^{QCL} = 8,$$

only maximum eight different beams are transmitted. In addition, no beam repetition for the same beam is allowed within a discovery burst transmission window. That is, in one example, when SSB is transmitted in one transmission opportunity, it will not be transmitted or repeated in another later transmission opportunities that are QCL-ed within the same DRS burst. This may limit the coherent combining and soft combining gain for NR supporting from 52.6 GHz and above. In addition, this may lead to additional latency and delay since if the SSB is not detected in the same DRS burst, the UE will need to wait for next DRS burst. Current NR supports SSB repetition across SS burst sets or DRS bursts but does not support SSB repetition within the same SS burst set or same DRS burst. Furthermore, it could significantly increase the power consumption for UE. There is a need to design a scheme to improve cell acquisition performance, minimize latency and reduce power consumption for UE.

Problem Statement (Rate Matching)

In current NR and NR-U rate matching is performed around nominal SSBs for PDSCH reception. Nominal SSB is the set of SSBs and candidate SSBs for NR and NR-U respectively. A simple design for rate matching may preclude all possible transmitted SSBs for rate matching. However, some SSB(s) may not be transmitted at all in the cell. In higher frequency range, larger number of SSBs needs to be transmitted compared to lower frequency, therefore, the rate matching issue may be more severe in a higher frequency range than in a lower frequency range. In order to optimize resource utilization and enhance the performance, a more efficient rate matching mechanism should be designed for NR supporting from 52.6 GHz and above.

To address these and other problems, the following is a summary of examples (i.e., methods, apparatus, and systems) described herein:

An example for a Flexible SSB Scheme

In one aspect, flexible signal and channel transmission is proposed for increasing channel access opportunities and mitigating interference for supporting NR from 52.6 GHz and above. Due to increased flexibility of transmission, a half radio frame indication could cause ambiguity of a frame boundary and may no longer be valid in a high SCS scenario if using a flexible SS burst set or DRS burst transmission. In legacy NR, there is only one such valid time offset. The ambiguity could occur if there is more than one valid time offset relative to the half-frame boundary of an SS burst set or DRS burst arising from a flexible SS burst set or DRS burst transmission. Examples for flexible signal and channel transmission as well as corresponding timing acquisition are proposed. Examples include changing the DRS burst window, the modification for indication and signaling as well as enhancement for the current mechanism for timing acquisition. One example may design a single SCS with high granularity in a time domain. Another example may design multiple SCSs with each SCS having an independent granularity. This may achieve better flexibility since each SCS may have its own timing granularity and flexibility. Yet another example may design multiple SCSs with unified granularity. This may consider the worst case design, which may decrease the level of flexibility, but it may lower the signaling overhead.

A SS or a PBCH DMRS may be used for enabling and indicating flexible transmission. One example may use multiple sets or partitions of SS. Another example may use multiple sets or partitions of PBCH DMRS. Yet another example may use multiple sets or partitions of any combination above.

Alternatively, one example may use spare bit (e.g., in MIB) for finer granularity for flexibility of transmission. Another example may use subCarrierSpacingCommon for finer granularity for flexibility of transmission. Yet another example may use pdcch-ConfigSIB1 e.g., MSB of pdcch-ConfigSIB1 for finer granularity for flexibility of transmission. Yet another example may use any combination above.

An example for RMSI CORSET SCS Indication/Multiplexing

In this example, an indication of a RMSI CORESET/PDCCH and a PDSCH SCS are proposed. One example may have multiple SCSs and have implicit association for SCS of RMSI CORESET with SCS of SSB. Another example may be to have an explicit indication for a SCS of a RMSI CORESET. Yet another example may use joint implicit association and explicit indication to indicate a RMSI CORESET/PDCCH and a PDSCH SCS and reduce signaling overhead.

An example for Enhancement to the Performance of Cell Acquisition

In this aspect, a scheme to improve performance, decrease latency and reduce power consumption is proposed. The aspect involves SSB repetition procedures, repetition indication and signaling and UE detection procedures. If SSB repetition can occur within the same DRS burst that are QCL-ed, then coherent combining and soft combining gain for SSB including PSS/SSS detection and PBCH decoding may be improved. In addition, latency may be reduced due to beam sweeping. Furthermore, power consumption for SSB detection may be reduced.

Mechanism to Support SSB Repetition within the Same DRS Burst.

One example may be to introduce a repetition indicator for a SS/PBCH block among its corresponding candidate SS/PBCH block index based on:

$$SS/PBCH \text{ block index} = (\bar{\imath} \bmod N_{SSB}^{QCL}).$$

In one example, if repetition indication is enabled, then full repetition may be performed for all candidate SS/PBCH block corresponding to the same SS/PBCH block index within the same DRS burst. Otherwise, no repetition may be performed. In addition to SSB repetition within the same DRS burst, SSB repetition may also be performed across DRS bursts. Another example may be to introduce a repetition indicator with additional information for repetition pattern. If repetition is enabled, then assistance information for which and how the repetition is performed may be indicated to UE. In this case partial repetition may be possible. For example, a value for number of repetitions may be indicated if repetition is "on". Yet another example may be to use a repetition bitmap to indicate the exact repetition that is performed for all candidate SS/PBCH blocks corresponding to the same SS/PBCH block index within the same DRS burst. For example, if the bitmap indicates all "0", then no repetition may be performed. Otherwise, repetition may be performed according to the repetition bitmap.

Another example may be to use multiple sets of SS e.g., PSS and/or SSS for repetition indication. Yet another example may use two or multiple sets of PBCH DMRS for repetition indication. Yet another example may be to use two or multiple partitions of SS e.g., PSS and/or SSS for repetition indication. Yet another example may use two or multiple partitions of PBCH DMRS for repetition indication.

Example for Enhancement to PDSCH Rate Matching

In this example, more efficient rate matching is proposed for the frequency range from 52.6 GHz and above. One example may be based on SSB detection by the UE. Another example may use an indication of a SSB transmission pattern or repetition pattern for rate matching purposes. Yet another example may use an indication of a bitmap for rate matching purposes. A QCL-based bitmap may be introduced.

Flexible SSB Scheme and Timing Methods and Procedures

Timeline related aspects adapted to the new numerologies in the frequency range are proposed. For flexible system and signal/channel transmission, one example may be to use smaller value SCS for a SSB with coarser granularity in time for flexibility of transmission for the SSB. Another example may be to have larger value SCS for a SSB with finer granularity in time for flexibility of transmission for the SSB.

For timing acquisition of half frame and frame boundary and to resolve timing ambiguity of half frame and frame due to transmission flexibility, additional control field or control information bit(s) may be used. Since a flexible SSB scheme may allow SSB transmission in finer granularity in time than granularity of a half frame, timing ambiguity to acquire a half frame and a frame boundary may arise. One example may introduce a new control field. Another example may reinterpret an existing control field. Yet another example may extend an existing control field. Yet another example may attach additional assistance information. Assistance information may be the control information used for enhancing finer granularity in time for flexibility of transmission One example may design a system with single SCS with high/fine granularity in the time domain. Another example may design a system with multiple SCSs with each SCS having independent granularity. This may achieve better flexibility since each SCS may have its own timing granularity and flexibility. For example, if SCS1 is indicated, baseline control field may be used. If SCS2 is indicated and SCS2>SCS1, then an additional bit may be used to enable additional flexibility. If SCS3 is indicated and SCS3>SCS2>SCS1, then another additional bit may be used to enable additional flexibility. Yet another example may design multiple SCSs with unified granularity. This may consider worst case design which may decrease the level of flexibility, but it may lower the signaling overhead.

One example may use a spare bit for finer granularity in time for flexibility of transmission. Another example may use subCarrierSpacingCommon for finer granularity in time for flexibility of transmission. Yet another example may use pdcch-ConfigSIB1 e.g., MSB of pdcch-ConfigSIB1 for finer granularity in time for flexibility of transmission. Yet another example may use any combination above. In addition, a SS or a PBCH DMRS may be used for enabling and indicating flexible transmission. One example may use multiple sets or partitions of a SS for finer granularity in time for flexibility of transmission. Another example may use multiple sets or partitions of a PBCH DMRS for finer granularity in time for flexibility of transmission. Yet another example may use multiple sets or partitions of combinations above for finer granularity in time for flexibility of transmission.

Currently in NR Rel-15/16 the highest SCS supported is 240 KHz for SSB transmission. A SS burst set or DRS burst is confined within 5 ms in NR. 5 ms is a half radio frame. In NR Rel-15/16 the half radio frame indicator, SS/PBCH block index, etc. are used for timing and frame boundary synchronization for a beam-based system. In Rel-17 in order to overcome phase noise, frequency offset, etc., the higher SCSs are proposed. Higher SCS such as SCS 480 KHz, 960 KHz, 1920 KHz, or higher SCSs, etc. may be used and supported in frequency range above 52.6 GHz. A SS burst set or DRS burst may be confined within a much shorter duration in frequency range from 52.6 GHz and above due to higher SCS. This may create an additional degree of freedom in a time domain for transmission of a SS burst set or DRS burst structure due to higher SCS and a shorter time duration.

This additional degree of freedom may be utilized to enhance SSB flexibility in a time domain for a SS burst set or DRS burst design and to enable more flexible SS burst set or DRS burst locations. Benefits may include mitigation of the interference to/from other UEs, nodes and/or cells using flexible SS burst set or DRS burst. The enhancement may be achievable as compared to a system without a flexible SSB scheme.

Due to enhanced flexibility and an additional degree of freedom in time, the current timing mechanism e.g., a half radio frame indication, a SSB indication, etc. could cause ambiguity of timing and ambiguity of a frame boundary and no longer provide accurate timing in high SCS scenario with the flexible SS burst set or DRS burst transmission that are proposed.

Figure 2:
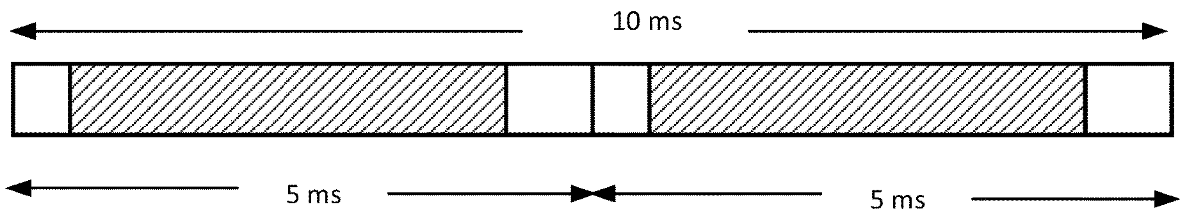
FIG. 2 shows an example of SS Burst Set or DRS Burst with Half Frame Indication (SCS=120 KHz/240 KHz)

A SS Burst Set or DRS burst with Half Frame Indication for SCS=120 KHz/240 KHz is depicted in FIG. 2. When SCS 120 KHz and 240 KHz are bundled and jointly considered in a frequency band, the worst case design is needed. The worst case would occur for SCS=120 KHz in a case of 120 KHz and 240 Khz jointly considered. A SS Burst Set or DRS burst are confined within a 5 ms half radio frame, therefore there are two transmission opportunities in a radio frame, the SS Burst Set or DRS burst is transmitted in the first half radio frame or the second half radio frame.

Figure 3:
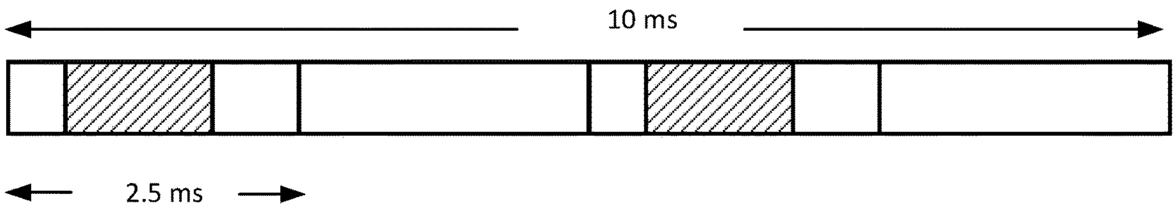
FIG. 3 shows an example of DRS Burst or SS Burst Set with Half Frame Indication (SCS=240 KHz)

A DRS burst or SS Burst Set with Half Frame Indication for SCS=240 KHz is depicted in FIG. 3. When SCS 240 KHz is bundled and jointly considered with SCS 120 KHz for a frequency band and a half radio frame indicator is used, then SCS 240 KHz could not increase transmission flexibility for a DRS burst or SS Burst Set. In this case, there are two transmission opportunities in a radio frame, the SS Burst Set or DRS burst is transmitted in the first half radio frame or the second half radio frame. For the case of longer periodicity, the transmission opportunities may further increase but at the cost of a longer delay, more buffering and higher complexity.

Figure 4:
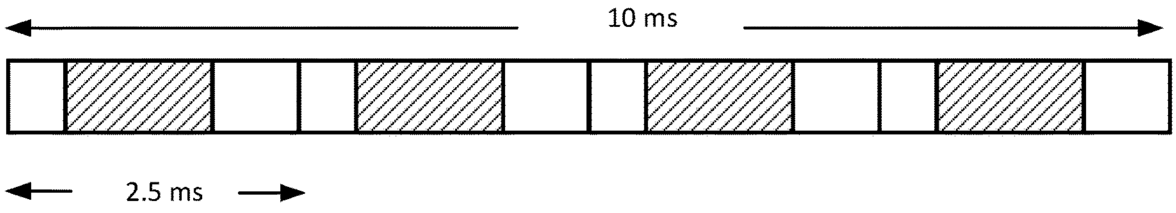
FIG. 4 shows an example of DRS or SS Burst Set with Quarter Frame Indication (SCS=240 KHz or 240 KHz/480 KHz)

A DRS or SS Burst Set for SCS=240 KHz with Quarter Frame Indication is depicted in FIG. 4. When SCS 240 KHz is not bundled with SCS 120 KHz, then SCS 240 KHz could increase transmission flexibility for a DRS burst or SS Burst Set. In this case, there are four transmission opportunities, the SS Burst Set or DRS burst may be transmitted in the first quarter radio frame, the second quarter radio frame, the third quarter radio frame or the fourth quarter radio frame. SCS 240 KHz may be bundled with higher SCSs such as 480 KHz or higher, this may still maintain the same transmission flexibility as the SCS 240 KHz alone without bundling with higher SCSs such as 480 KHz or higher. There are four transmission opportunities, the SS Burst Set or DRS burst may be transmitted in one of the four quarter radio frames.

For RRM measurement, a DRS burst window or SSB-based RRM Measurement Time Configuration (SMTC) window may be configurable. If a DRS or SMTC window is not sufficient, a larger window may be configured and used, and vice versa. Alternatively, transmission flexibility may be restricted within a smaller duration, e.g., within a half frame or 5 ms, or shorter for supporting RRM measurement and mobility.

Figure 5:
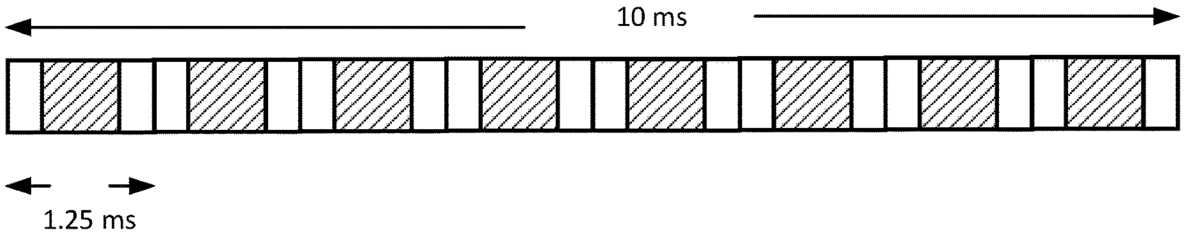
FIG. 5 shows an example of DRS or SS Burst Set with ⅛ Frame Indication (SCS=480 KHz or SCS=480 KHz/960 KHz)

When even higher SCSs are utilized, more transmission flexibility could be achieved. A DRS or SS Burst Set for SCS=240 KHz with ⅛ Frame Indication is depicted in FIG. 5. When SCS 480 KHz is not bundled with lower SCSs such as 240 KHz or 120 KHz, then SCS 480 KHz could further increase transmission flexibility for a DRS burst or SS Burst Set as compared with SCS 240 KHz or lower SCSs. In this case, there are eight transmission opportunities. The SS Burst Set or DRS burst may be transmitted in the first ⅛ radio frame, the second ⅛ radio frame, the third ⅛ radio frame and so on. SCS 480 KHz may be bundled with higher SCSs such as 960 KHz or higher. This may still maintain the same transmission flexibility as the SCS 480 KHz alone without any bundling with higher SCSs such as 960 KHz, 1920 KHz or higher. There are eight transmission opportunities. The SS Burst Set or DRS burst may be transmitted in one of the eight ⅛ radio frames.

A gNB or network may select in which portion or fraction of the radio frame that the SSBs may be transmitted. Alternatively, the gNB or network may select one of the opportunities within a radio frame for each SSB period, e.g. based on semi-static, dynamic, or instantaneous conditions such as instantaneous channel access conditions. For example, in one period the gNB or network may use the first opportunity, in the next period the gNB or network may use the 3rd opportunity, and so on.

Figure 6:
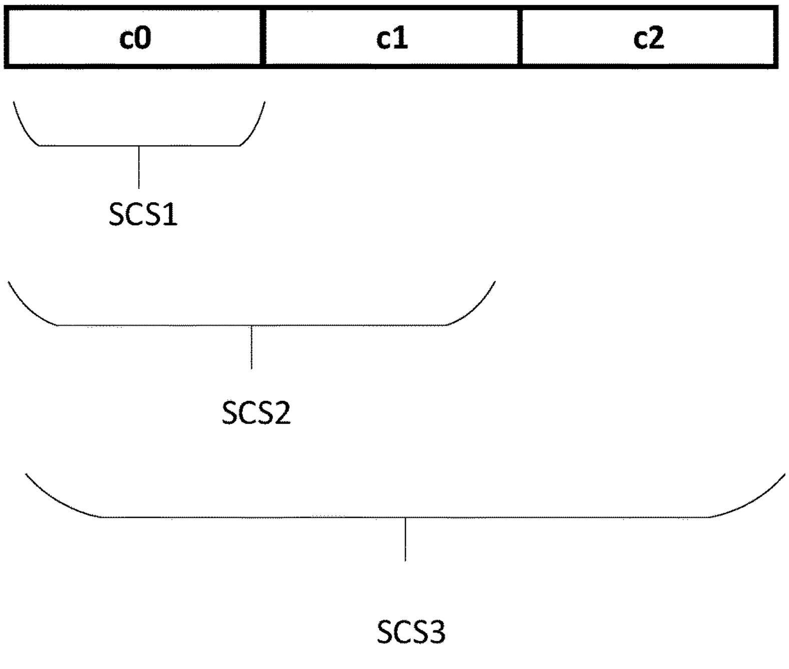
FIG. 6 shows an example of SCS-dependent timing indication and signaling.

In order to indicate the timing of a proposed flexible transmission scheme, examples for timing indication are proposed. One example may use a baseline indication together with additional indication or assistance information. SCS-dependent timing indication and signaling is depicted in FIG. 6.

For example, c0 may be the baseline indication for timing and may be an explicit indication. For example, c0 may be a half radio frame indicator. c1 and c2 may be an extension indication for timing or assistance information for timing in addition to a baseline indication. For example, c1 may be a quarter frame indicator. c2 may be a ⅛ frame indicator. c1 and c2 may be either an explicit or an implicit indication or a combination of both. An explicit indication may be a timing indication carried in a PBCH payload with explicit bit(s). An implicit indication may be a timing indication carried in a PBCH DMRS, PSS and/or SSS implicitly. For example, c0 may be carried in a PBCH payload. c1 and c2 may be carried in the PBCH payload, a PBCH DMRS, PSS and/or SSS. c0 may have coarse indication for coarse granularity of transmission flexibility. c1 and c2 may extend the transmission flexibility to finer granularity as described previously.

Figure 7:
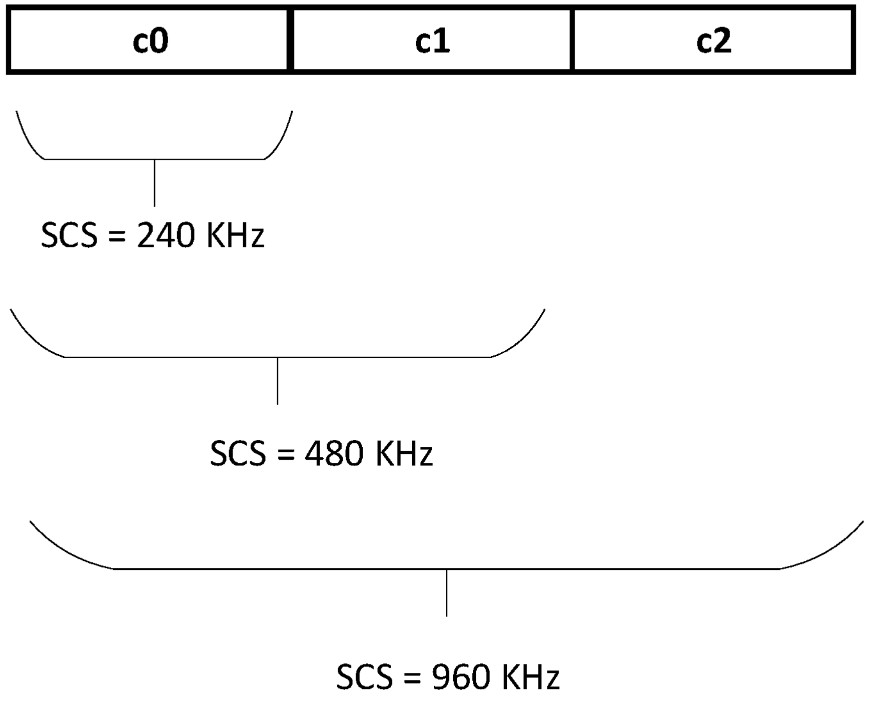
FIG. 7 shows an example of SCS-dependent timing indication and signaling.

SCS-dependent timing indication and signaling for SCS240 KHz, 480 KHz and 960 KHz is depicted in FIG. 7. For example, c0 may be the baseline indication of timing for SCS 240 KHz and may be an explicit indication for SCS 240 KHz. c1 and c2 may be extension indication or assistance information of timing for 480 KHz and 960 KHz in addition to the baseline indication c0. c1 and c2 may be either an explicit or an implicit indication or combination of the explicit and the implicit indication for SCSs 480 KHz and 960 KHz.

For another example, c0 may be the baseline indication which may use one explicit bit to indicate the first half frame or second half frame. The explicit bit may be carried in a PBCH payload. c1 and c2 may be the extension indication or assistance information for finer timing for additional SCSs. c1 and c2 may use one or more bit (e.g., in a MIB and/or a PBCH payload) or two or more sequences for indication purposes. c1 and c2 may be carried in a PSS/SSS, a PBCH DMRS and/or a PBCH payload. A SSB may also be associated with CSI-RS which may be used for carrying indication c1 and c2.

The half frame control field may be replaced with a new control field. A new control field may have a larger bit size which may indicate one out of N frame fractions (fraction=1/N). The new control field may be used together with a SSB-based time offset to determine the final frame timing. The SSB-based time offset is a fixed offset in time with respective to 1/N frame boundary. In this example, a new control field may replace a half frame indication.

Figure 8:
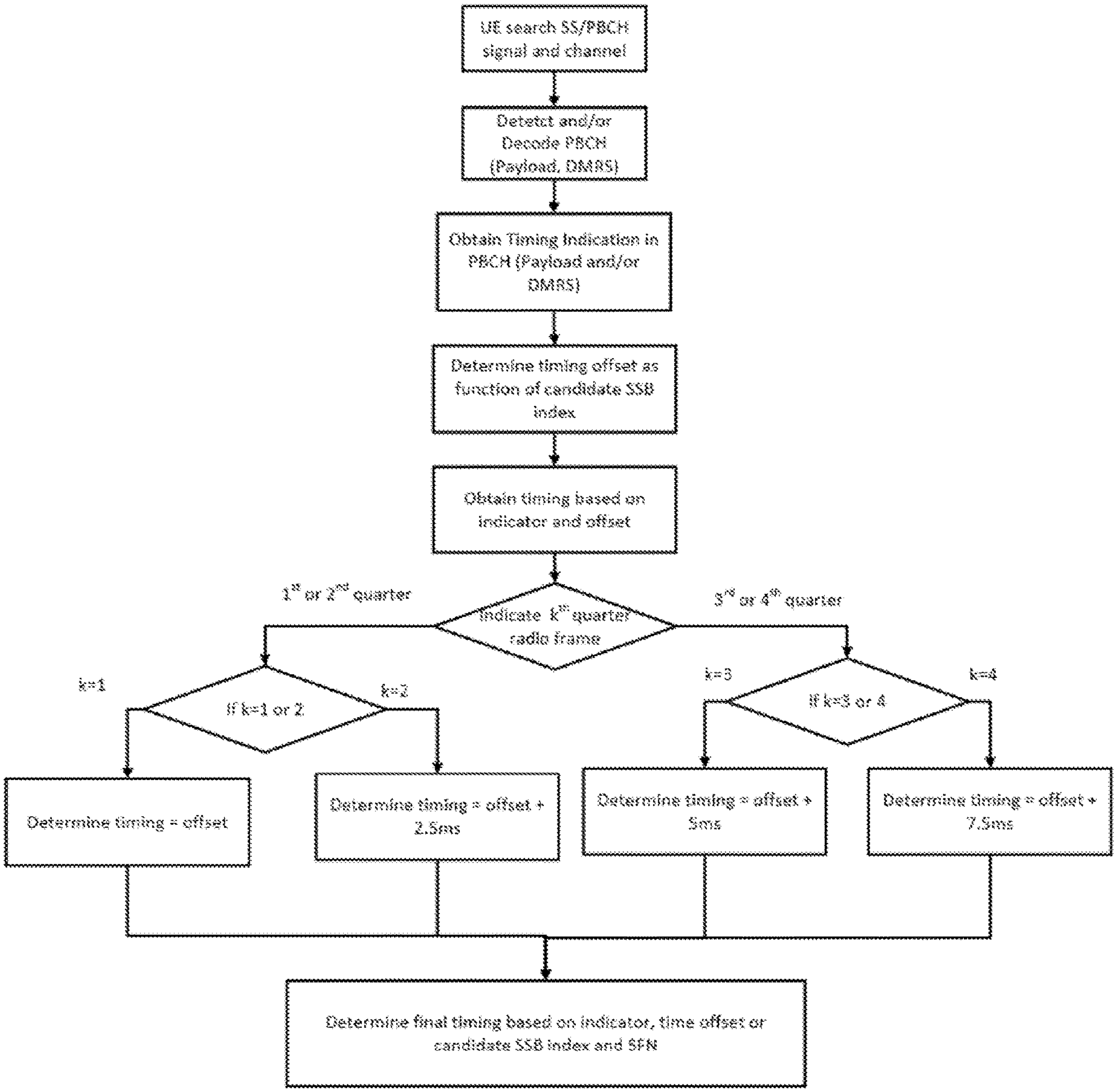
FIG. 8 shows an example method for timing acquisition (New Control Field to Replace Half Frame Indication)

One example of the method of a timing acquisition scheme is depicted FIG. 8. A UE may search and detect a SS/PBCH block signal and channel. The UE may decode a PBCH payload. The UE may obtain a timing indication in the PBCH payload. The UE may determine a timing offset based on a SSB index. The UE may obtain accurate timing based on an indication and an obtained timing offset.

A UE may determine which portion of a frame that SSBs reside, e.g., the 1st, 2nd, 3rd or 4th quarter frame. The UE may determine timing based on the formula below:

$$\text{FR4 frame boundary}=\text{Time Offset}+(k-1)\times 2.5\text{ ms}$$

A time offset is a predefined offset. A value of k may be indicated by a timing indication c0, c1 and/or c2 described previously. A UE may further obtain system frame number (SFN) in a PBCH and determine the complete system frame timing based on obtained frame boundary above and SFN.

A flowchart of an example of a timing acquisition scheme using a new control field to replace a half frame indication is depicted in FIG. 8.

A UE may search a SS/PBCH signal and channel. The UE may detect and/or decode a PBCH and obtain a timing indication in either the PBCH payload, a PBCH DMRS or combination of both.

A UE may determine a time offset as a function of a candidate SSB index.

The UE may obtain the timing based on a joint timing indicator and a time offset. The timing indicator may indicate the kth quarter radio frame.

A value of k may be the 1st, 2nd, 3rd or 4th quarter radio frame.

If k=1, a UE may determine a frame timing equal to time offset

If k=2, a UE may determine a frame timing equal to time offset+2.5 ms

If k=3, a UE may determine a frame timing equal to time offset+5 ms

If k=4, a UE may determine a frame timing equal to time offset+7.5 ms

UE may determine the final frame timing based on a time indicator, a time offset or a candidate SSB index and SFN.

Another example may use an additional indicator in addition to the half frame indicator. For example, N bits are used in addition to the half frame indication. If a half frame is divided into M portions, then N=log 2(M). A UE may first determine the half radio frame, then use the introduced higher SCS-based time indicator to determine which portion or time position within the half frame.

Figure 9:
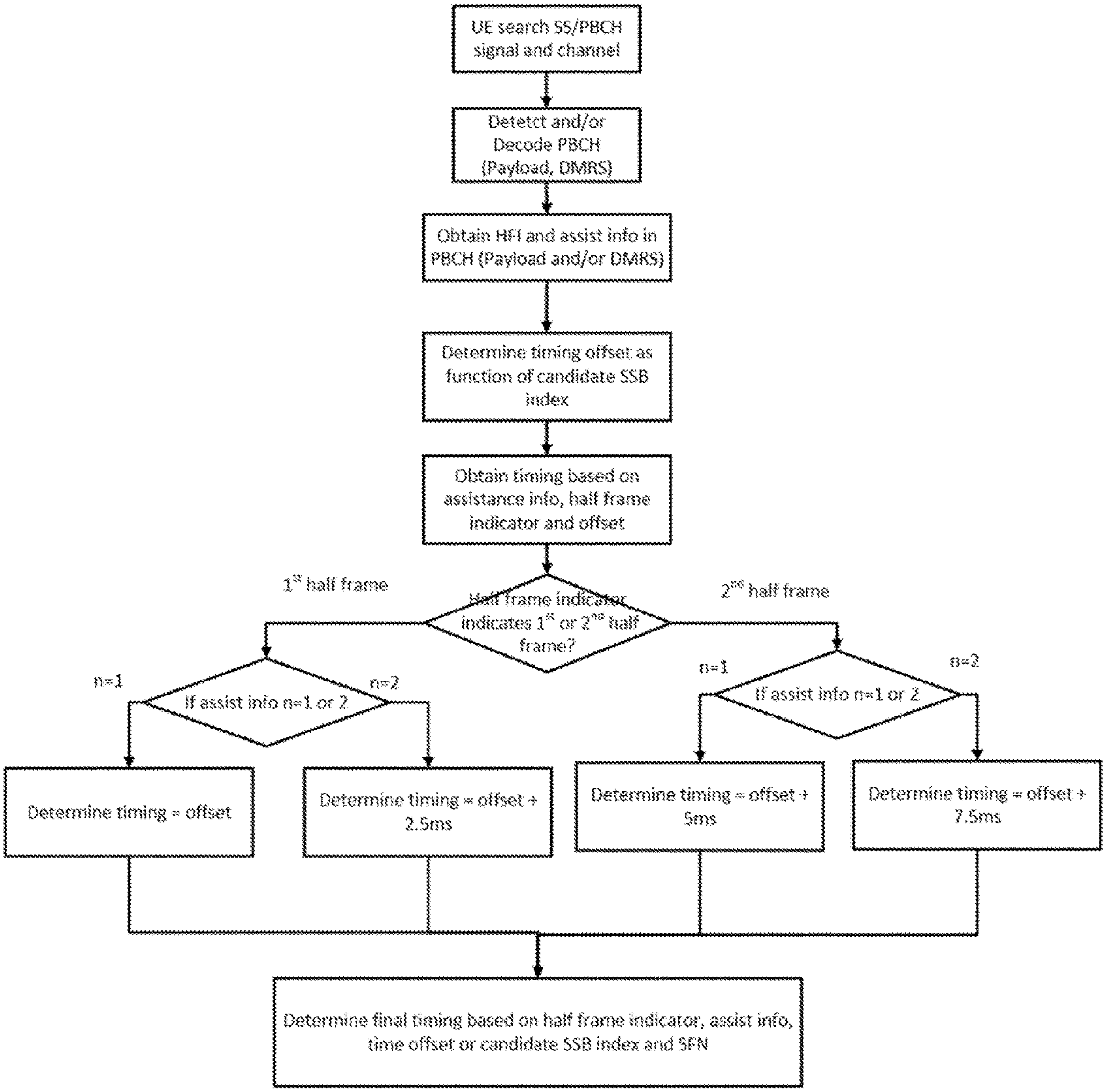
FIG. 9 shows another example method for timing acquisition (Assistance Information in addition to Half Frame Indication)

A flowchart of a timing acquisition scheme using additional control field or assistance information attached or in addition to a half frame indication is depicted in FIG. 9.

A UE may search a SS/PBCH signal and channel. The UE may detect and/or decode a PBCH and obtain a half frame indicator and assistance information in either a PBCH payload, a PBCH DMRS or a combination of the two. Assistance information may be obtained in either the PBCH payload, the PBCH DMRS or a combination of the two. Assistance information may be obtained in the PBCH DMRS or a PSS/SSS, e.g., using different sets or partitions of the DMRS and/or PSS and/or SSS and/or associated CSI-RS or other signal(s) or channel(s).

A UE may determine the time offset as a function of candidate SSB index. The UE may obtain the timing based on assistance information, a half frame indicator (HFI) and a time offset.

The half frame indicator may indicate the 1st or 2nd half radio frame. The assistance information may indicate the first portion or second portion within the indicated half radio frame.

A value of assistance information n may be 1 or 2.

If HFI=1 and n=1, UE may determine frame timing equal to offset.

If HFI=1 and n=2, UE may determine frame timing equal to offset+2.5 ms.

If HFI=2 and n=1, UE may determine frame timing equal to offset+5 ms.

If HFI=2 and n=2, UE may determine frame timing equal to offset+7.5 ms.

The UE may determine the final frame timing based on the HFI, the assistance information, the time offset, the candidate SSB index and a SFN.

The examples above illustrate two of the possible methods, systems, apparatuses, and the like that may provide for ways for Beam-based channel access for supporting new radio above 52.6 GHz. More generally, a method, system, computer readable storage medium, or apparatus may provide for receiving a wireless communications signal comprising an SSB. The SSB may comprise a PBCH which may comprise information indicating a timing indicator of a cell and/or an implicit or explicit association between a SCS of the SSB and a SCS of a CORESET/RMSI. There may also be a timing offset associated with the cell. Based in part on the timing indicator, the timing offset, and the SCS of the SSB, a final synchronization timing of the cell may be determined. Additionally, based on the SCS of the SSB and one or both of the implicit or explicit association between the SCS of the SSB and the SCS of the CORESET/RMSI, the SCS associated with the CORESET/RMSI may be determined. In one embodiment the SSB may comprise a SS/PBCH block. Furthermore, the SS/PBCH may comprise one or more of a PSS, a SSS, or a PBCH. In another embodiment, the timing indicator may comprise a HFI and assistance information, and the final synchronization timing may be determined based on the HFI and the assistance information. In yet another embodiment, the timing indicator may indicate a first quarter of a radio frame, a second quarter of a radio frame, a third quarter of a radio frame, or a fourth quarter of a radio frame.

Furthermore, a method, system, computer readable storage medium, or apparatus may provide for generating, within a cell, a signal that comprises a radio frame divided into a plurality of segments, a timing indicator associated with one of the plurality of segments of the radio frame, and an index comprising an offset indicator. The offset indicator may be associated with a timing offset within the radio frame. Furthermore, a request may be received by a UE to synchronize, and the request may be based in part on the timing indicator and the offset indicator. The UE may then synchronize. In one embodiment, the radio frame may comprise a SSB. Furthermore, the SSB may comprise one or more of a PSS, a SSS, or a PBCH. In another embodiment, the radio frame may be divided into four quarters. The timing indicator may comprise a first timing indicator associated with a first quarter of the four quarters. In another embodiment, the timing indicator may comprise a second timing indicator associated with a second quarter of the four quarters. In yet another embodiment, the timing indicator may comprise a third timing indicator associated with a third quarter of the four quarters. In another embodiment, the timing indicator may comprise a fourth timing indicator associated with a fourth quarter of the four quarters. In another embodiment, the timing indicator may be determined based on a HFI and assistance information.

The UE may receive an SSB and determine a timing indicator from the SSB or a PBCH. The UE may also receive assistance information from the SSB or the PBCH. The UE may determine from the SSB or the PBCH an implicit association, an explicit association or a hybrid association between a SCS of the SSB and a SCS of a CORESET or a RMSI. The UE may also determine a timing offset. The UE may determine a final synchronization timing associated with the cell based on the timing indicator, the assistance information, the timing offset and the SCS of the SSB and determine the SCS associated with the CORESET or the RMSI based on the SCS of the SSB and the indication of the at least one implicit association, the explicit association or hybrid association that is indicated in the SSB or the PBCH.

The UE may request for timing synchronization. The UE may send a request signal and/or a channel that contains request information. The request information may include the type of assistance information, the parameters for SSB transmission such as SSB transmission periodicity, the SCS of SSB, or the like.

RMSI and CORESET SCS Indication

Examples for indication of a RMSI CORESET/PDCCH and a PDSCH SCS are proposed. One example may have multiple SCSs and have implicit association for an SCS of the RMSI CORESET with a SCS of a SSB. Another example may be to have an explicit indication for the SCS of the RMSI CORESET. Yet another example may use joint implicit association and explicit indication (a hybrid indication that may use and involve both implicit and explicit indication). Different frequency bands in FR4 may be associated with different sets of SCSs e.g., two or more RMSI SCSs, and two or more SSB SCSs.

Figure 10:
FIG. 10 shows an example of RMSI CORESET SCS Association Type (one-to-one)

As shown in FIG. 10, there are multiple SCSs for SSB and multiple SCSs for RMSI. Association between SCSs for SSB and multiple SCSs for RMSI may be predefined or preconfigured and may have one-to-one mapping. For example, SSB may have two candidate SCSs, namely SCS-1 and SCS-2. RMSI may have two SCSs, namely SCS-A and SCS-B. Association between SCSs for SSB and multiple SCSs for RMSI may be the following: SCS-1 and SCS-2 of SSB may be associated with SCS-A and SCS-B of RMSI respectively. Alternatively, SCS-1 and SCS-2 of SSB may be associated with SCS-B and SCS-A of RMSI respectively. Such association may be preconfigured or configured and indicated in a SS/PBCH block. Alternatively, such association type may be indicated in a PSS and/or a SSS, a PBCH DMRS and/or a PBCH payload or a MIB.

Figure 11:
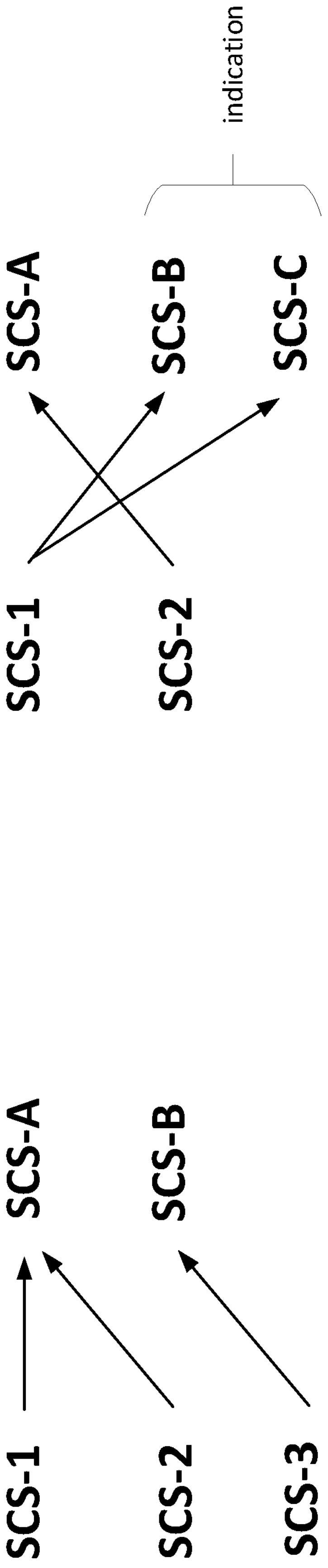
FIG. 11 shows an example of RMSI CORESET SCS Association Type and Indication (many-to-one or one-to-many)

As shown in FIG. 11, there are multiple SCSs for SSB and multiple SCSs for RMSI CORESET and PDSCH. Association between SCSs for SSB and multiple SCSs for RMSI may be predefined or preconfigured and may have many-to-one mapping or one-to-many mappings.

CORESET is a control resource set. RMSI CORESET and PDSCH may have the same SCS. SCS for RMSI CORESET and PDSCH may be the same as or different from SCS for SSB.

SSB and SS/PBCH block may be used interchangeably.

For example, SSB may have SCSs, namely SCS-1, SCS-2 and SCS-3. RMSI may have SCSs, namely SCS-A and SCS-B. For many to one mapping, association between SCSs for SSB and multiple SCSs for RMSI may be the following: SCS-1 and SCS-2 of SSB may be associated with SCS-A and SCS-3 may be associated with SCS-B of RMSI.

In another example, SSB may have SCSs, namely SCS-1 and SCS-2. RMSI CORESET and PDSCH may have multiple SCSs, namely SCS-A, SCS-B and SCS-C. For one to many mappings, association between SCSs for SSB and multiple SCSs for RMSI CORESET and PDSCH may be the following: SCS-1 of SSB may be associated with SCS-B and SCS-C of RMSI (CORESET and PDSCH). SCS-2 may be associated with SCS-A of RMSI. Because SCS-1 of SSB is associated with SCS-B and SCS-C of RMSI, such one-to-many mappings may result in SCS ambiguity for RMSI. Thus, an additional indication may be used to further distinguish between SCS-B and SCS-C of RMSI. Such additional explicit SCS indication may be used to further distinguish multiple SCSs (e.g., between SCS-B and SCS-C) of RMSI CORESET and PDSCH in combination with an implicit SCS association between SSB's SCS and RMSI's SCS. Since SCS-2 is one-to-one associated with SCS-A, there is no ambiguity for SCS and no additional signaling is required to further distinguish and indicate the specific SCS for RMSI. When association is not used, higher signaling overhead may occur. Because SCSs for SSB may be associated with a subset of SCSs for RMSI, rather than a full set of SCSs for RMSI, the number of bits or sequences that are required for indication and/or signaling for SCS of RMSI may be reduced.

To indicate SCS, one example may be to associate the SCS of SSB with SCS of RMSI CORESET. For example, if there are two SCSs for SSB and two SCSs for RMSI CORESET, one example may be associate SSB SCS-1 with RMSI CORESET SCS-A and SSB SCS-2 with RMSI CORESET SCS-B, or associate SSB SCS-1 with RMSI CORESET SCS-B and SSB SCS-2 with RMSI CORESET SCS-A. This example does not require any signaling overhead.

Another example may be to carry an SCS indicator in a PBCH payload and/or a PBCH DMRS. Yet another example may be to restrict a single SCS for RMSI CORESET. Here there may still be two or more SCSs for SSB, but regardless which SCS is for SSB, there is only a single SCS for RMSI CORESET. This may be a special case for many-to-one mapping.

Yet another example may use implicit indication and when one-to-many association is used for RMSI CORESET, an additional indication for SCS of RMSI CORESET may be used. This may lower the signaling overhead with a combination of implicit and explicit indication.

To reduce the beam sweep overhead, latency and complexity in supporting NR above 52.6 GHz, the same SCS (e.g., 480 KHz vs 480 KHz) may be used for SS/PBCH and RMSI. Reduced multiplexing patterns may be supported, e.g., support only FDM multiplexing pattern, such as multiplexing pattern 3 (or multiplexing pattern 2) and may not support TDM multiplexing pattern such as multiplexing pattern 1.

SSB/PBCH and RMSI may use different repetition patterns and different repetition numbers in a time domain in order to minimize the impact to latency and power consumption. For example, SS/PBCH block or RMSI sweeping strategy for e.g. a duration may be determined in terms of acceptable or required latency and power consumption. The transmission of the other quantity may be performed in way that falls in the sweeping duration imposed by the first quantity. For example, the beam sweeping duration may be determined based on SSB/PBCH block transmission, the RMSI transmission may be performed such that it fits into the windows dictated by SSB.

SSB Repetition Mechanism and Procedures

In this section, examples for enabling SSB repetition are proposed. Corresponding methods and procedures are proposed.

A UE may determine SSBs that are QCL-ed within the DRS burst using the following: for an operation with shared spectrum channel access, the UE may assume that SS/PBCH blocks in a serving cell that are within a same discovery burst transmission window or across discovery burst transmission windows that are quasi co-located (QCL-ed) if the value of $$\left(N_{DM\text{-}RS}^{PBCH} \bmod N_{SSB}^{QCL}\right) \text{ or } \left(\text{Candidate } SSB \text{ index mod } N_{SSB}^{QCL}\right)$$

is the same among the SS/PBCH blocks.

$$N_{DM\text{-}RS}^{PBCH}$$

is an index of a DM-RS sequence transmitted in a PBCH of a corresponding SS/PBCH block or having the same SSB index, and $$N_{SSB}^{QCL}$$

is either provided by ssb-PositionQCL-r16 or obtained from a MIB provided by a SS/PBCH block.

The UE may determine an SS/PBCH block index according to $$SS/PBCH \text{ block index} = \left(\bar{\imath} \bmod N_{SSB}^{QCL}\right) \quad (1)$$

where $\bar{\imath}$ is the candidate SS/PBCH block index.

One example may be to introduce a repetition indicator for a SS/PBCH block among its corresponding candidate SS/PBCH block index based on Equation (1) above. If repetition indication is enabled, then full repetition is performed for all candidate SS/PBCH block corresponding to the same SS/PBCH block index within the same DRS burst. Otherwise, no repetition is performed within the same DRS burst. Such repetition may also be performed across DRS bursts regardless if a repetition indication is “On” or “Off”. Another example may be to introduce a repetition indicator with additional information for a repetition pattern. If repetition is enabled, then assistance information for which and how the repetition is performed may be indicated to a UE. In this case, partial repetition may be possible. For example, a value for a number of repetitions may be indicated if repetition is “on”. Yet another example may be to use a repetition bitmap to indicate the exact repetition that is performed for all candidate SS/PBCH blocks corresponding to the same SS/PBCH block index within the same DRS burst. For example, if the bitmap indicates all “0”, then no repetition may be performed. Otherwise, repetition may be performed according to the repetition bitmap. A restricted repetition bitmap may be used for reduced signaling overhead. Alternatively, a subset of the bitmap or a subset of combinations of bits in the bitmap may be used for reduced signaling overhead.

For example, for 64 candidate SSB beams with eight different beams, assume only 2 different SSB beams may be transmitted based on ssb-PositionsInBurst. SSB beams may represent different beams. A candidate SSB beam may represent the candidate beams from which the different SSB beams may choose to transmit. In this case, ssb-PositionsInBurst may indicate 11000000. SSB n may represent SSB with SSB index n where n may represent the value of the SSB index. Thus, only SSB0 and SSB1 may be transmitted. SSB2 to SSB7 may not be transmitted. Based on a QCL relationship, candidate SSB0, 8, 16, 24, 32, 40, 48, 56 may be QCL-ed and candidate SSB1, 9, 17, 25, 33, 41, 49, 57 may be QCL-ed within the DRS burst. A QCL-based bitmap may indicate 10101010. In this case, SSB0 may be transmitted using candidate SSB0, and SSB0 may be repeated using candidate SSB 16, 32, 48. Similarly, SSB1 may be transmitted using candidate SSB1. SSB1 may be repeated using candidate SSB17, 33, 49. Different values of the QCL-based bitmap may be indicated. If the QCL-based bitmap indicates “11111111”, this may become full repetition. To reduce the signaling overhead, a subset of the bitmap may be predefined or allowed for the QCL-based bitmap and a code-point may be associated with each predefined QCL-based bitmap value. Alternatively, some restrictions may be applied to the QCL bitmap such that full bits may not be needed to indicate repetition at the cost of decreased indication flexibility.

Another example may be to use two or more sets of SS e.g., PSS and/or SSS for repetition indication. Yet another example may use two or more sets of PBCH DMRS for repetition indication. Yet another example may be to use two or more partitions of SS e.g., PSS and/or SSS for repetition indication. Yet another example may use two or more partitions of PBCH DMRS for repetition indication.

One example may be to use SSB repetition within the DRS burst for frequency offset estimation and compensation. Such repetition may be performed within the same DRS burst window. Another example may adjust the SSB burst set or DRS burst periodicity. However, such approach may potentially result in large sampling, additional buffering and complexity, and higher power consumption due to shorter periodicity.

One example may be to introduce a repetition indicator in a SS/PBCH block. If a UE detects an SSB with such a repetition “ON”, the UE may expect to receive the repeated SSB within the same DRS burst. The UE may expect that a number of transmitted SS/PBCH blocks with a same SS/PBCH block index greater than one. Otherwise, if the repetition indicator is OFF, then the UE may expect that a number of transmitted SS/PBCH blocks with a same SS/PBCH block index is not greater than one. Such a repetition indicator may be carried in PSS, SSS, PBCH DMRS or PBCH payload.

UE procedures may be the following: when the UE first detects a SSB, the UE may check a repetition indicator. If the repetition indicator is ON, then the UE may continue to receive SSB and perform coherent combining or soft combining within the same DRS burst. If the repetition indicator is OFF, the UE may stop receiving SSB within the same DRS burst. The UE may check the energy (e.g., PSS, SSS and/or DMRS, etc.) against a (pre-) configured or indicated threshold, if the measured energy is above the threshold, the UE may perform coherent combining or soft combining for the SSBs, otherwise, the UE may discard this SSB and not include this SSB for coherent combining or soft combining. This may significantly increase the SSB performance, decrease the latency and delay, and reduce the power consumption for the UE.

Figure 12:
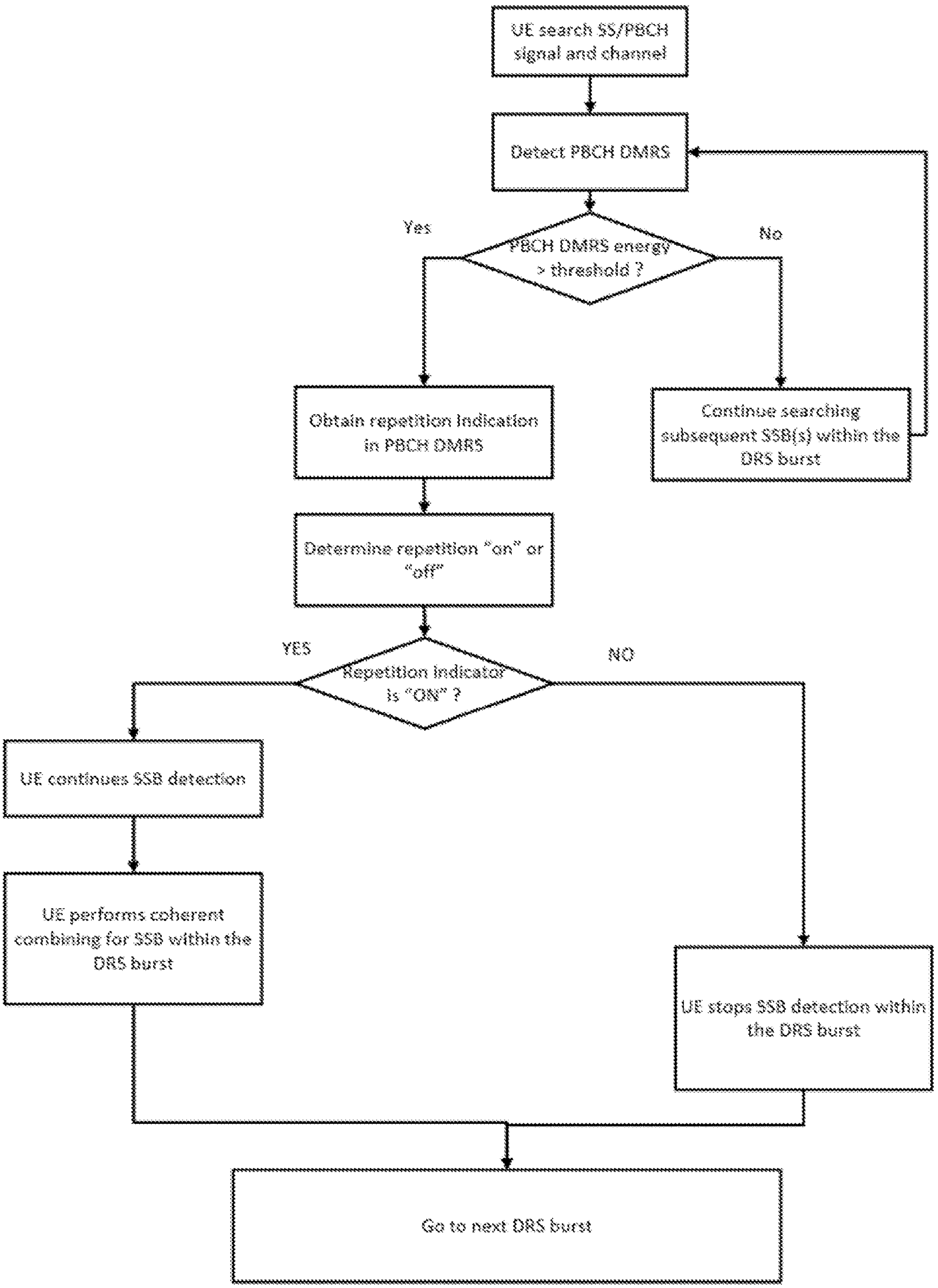
FIG. 12 shows an example of SSB Repetition Using Repetition Indicator in PBCH DMRS with Full Repetition.

One example may be to carry a repetition indicator in PBCH DMRS. SSB repetition using the repetition indicator in PBCH DMRS is depicted in FIG. 12.

The UE may search a SS/PBCH signal and channel. The UE may detect PBCH DMRS and check PBCH DMRS energy against a threshold. Such threshold may be predefined, (pre-)configured or indicated. If PBCH DMRS energy is not greater than the threshold, then the UE may continue searching subsequent SSB(s) within the DRS burst and detecting PBCH DMRS.

If received PBCH DMRS energy is above the threshold, then the UE may obtain the repetition Indication in PBCH DMRS. The UE may determine the repetition is “on” or “off”. If the obtained repetition indicator is “ON”, then the UE may continue the SSB detection. The UE may check whether the SSB is QCL-ed. The UE may perform coherent combining for all QCL-ed SSBs within the DRS burst.

If the obtained repetition indicator is “OFF”, then the UE may stop the subsequent SSB detection for the QCL-ed SSBs of the same SSB index within the DRS burst. Once the UE finishes this DRS burst, the UE may go to the next DRS burst.

Figure 13:
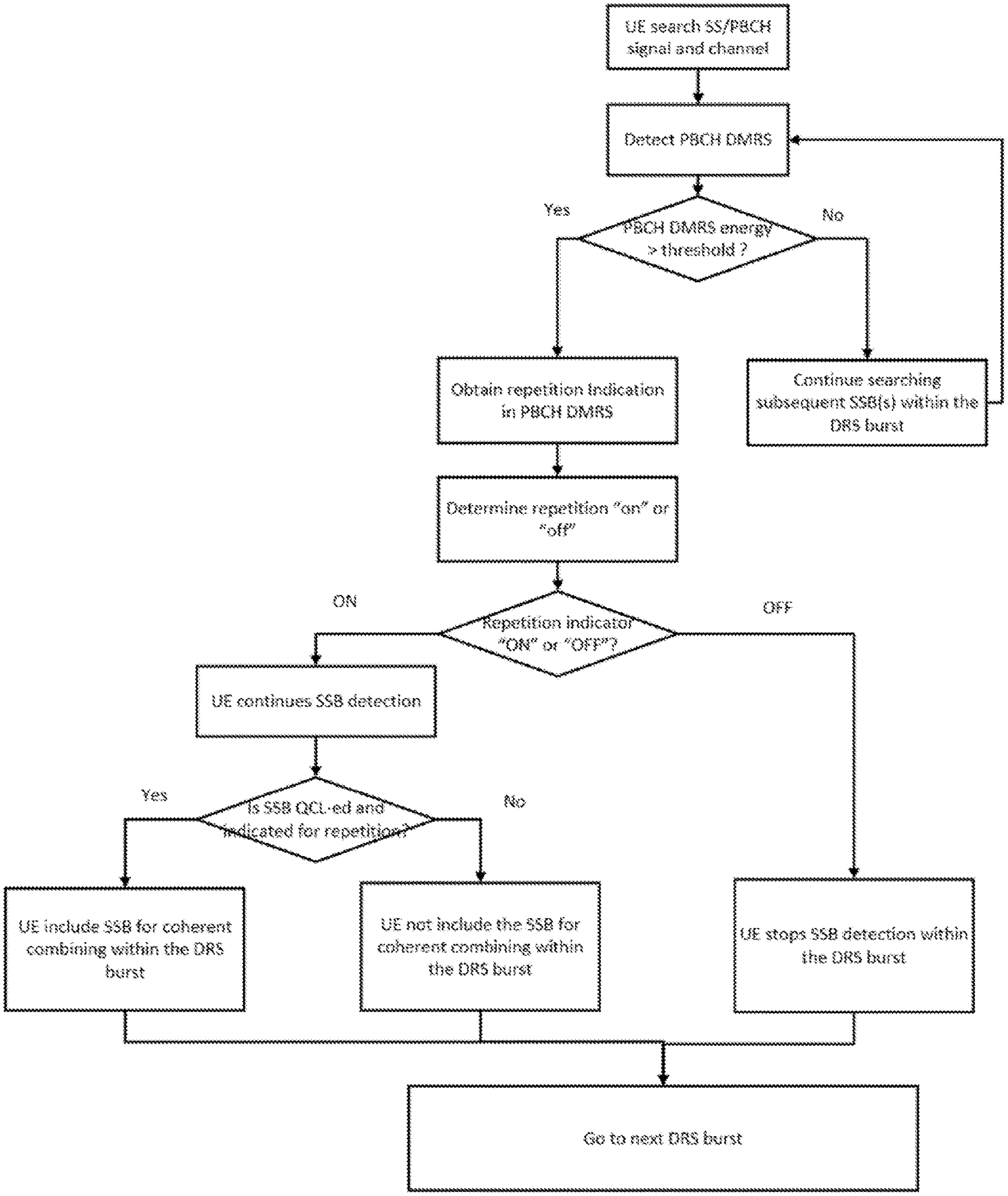
FIG. 13 shows an example of SSB Repetition Using Repetition Indicator in PBCH DMRS with Partial Repetition.

The method of SSB repetition using repetition indicator in PBCH DMRS is depicted in FIG. 13. A UE may search a SS/PBCH signal and channel. The UE may detect PBCH DMRS and check PBCH DMRS energy against a threshold. Such threshold may be predefined, (pre-)configured or signaled. If PBCH DMRS energy does not exceed the threshold, then the UE may continue searching subsequent SSB(s) within the DRS burst and detecting PBCH DMRS.

If received PBCH DMRS energy is above the threshold, then the UE may obtain the repetition Indication in PBCH DMRS. The UE may determine repetition "on" or "off". If the obtained repetition indicator is "ON", then the UE may continue the SSB detection.

The UE may check whether the SSB is QCL-ed and whether repetition for that QCL-ed SSB is indicated. If yes, then the UE may include the SSB for coherent combining within the DRS burst. The UE may perform coherent combining within the DRS burst using partially repeated SSBs that are QCL-ed. Not all QCL-ed SSBs may be used for coherent combining and soft combining. Only indicated QCL-ed SSBs (QCL-ed SSBs that are indicated) may be used for coherent combining and soft combining.

If the SSB is not QCL-ed or the SSB is QCL-ed but repetition for that QCL-ed SSB is not indicated, then the UE may not include the SSB for coherent combining within the DRS burst.

If the obtained repetition indicator is "OFF", then the UE may stop SSB detection within the DRS burst. Once the UE finishes this DRS burst, the UE may go to next DRS burst.

Figure 14:
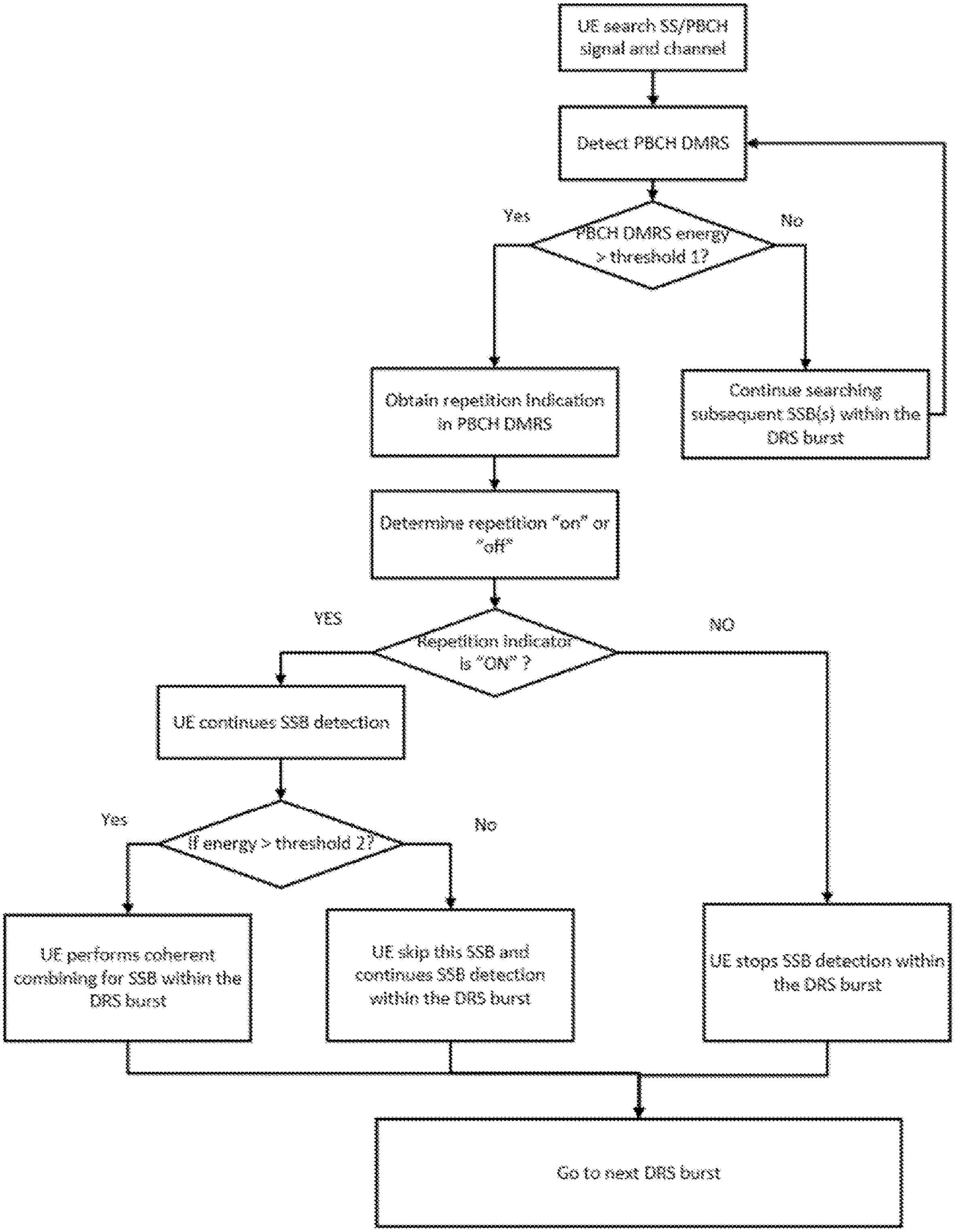
FIG. 14 shows an example of SSB Repetition Using Repetition Indicator in PBCH DMRS with Additional Energy Detection.
Figure 15:
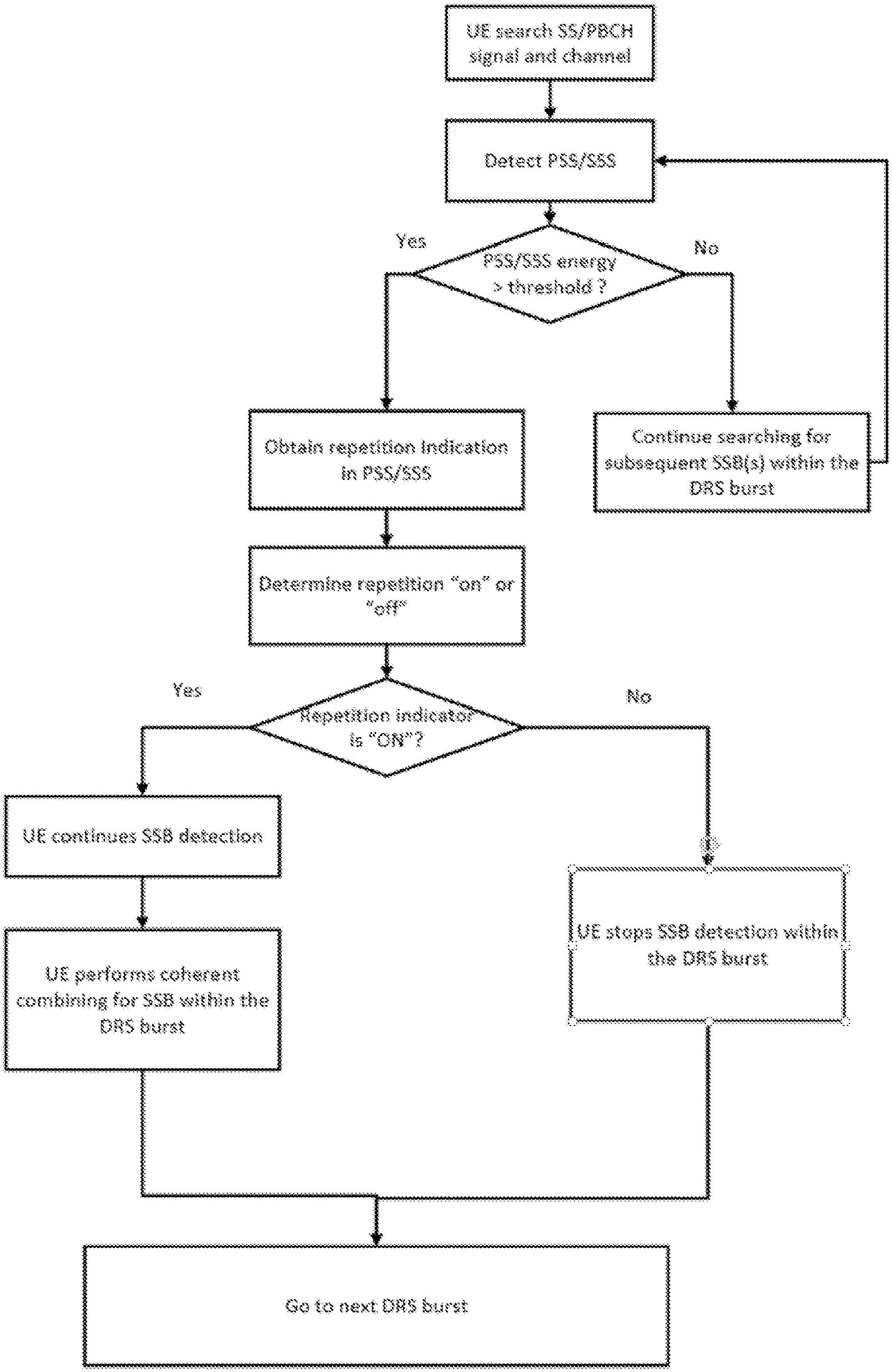
FIG. 15 shows an example of SSB Repetition Using Repetition Indicator in PSS and/or SSS.

The method of UE behavior when SSB Repetition Using Repetition Indicator in PBCH DMRS is depicted in FIG. 14. A UE may search SS/PBCH signal and channel. The UE may detect PBCH DMRS and check PBCH DMRS energy against a threshold. Such a threshold may be predefined, (pre-)configured or indicated. If the received PBCH DMRS energy is below the threshold, then the UE may continue searching subsequent SSB(s) within the DRS burst and detecting PBCH DMRS.

If the received PBCH DMRS energy is above the threshold, the UE may obtain the repetition Indication in PBCH DMRS. The UE may determine the repetition indicator is "on" or "off". If the obtained repetition indicator is "ON", the UE may continue the SSB detection. The UE may perform coherent combining for SSB within the DRS burst.

The UE may further check the energy level. If energy is greater than a second threshold, the UE may perform coherent combining for SSB within the DRS burst. If energy is not greater than a second threshold, the UE may skip and discard this SSB and continue SSB detection within the DRS burst.

For each SSB index, coherent combining and soft combing may be performed for the same SSB index within the same DRS burst. For different SSB indices, coherent combining and soft combing may not be performed across different SSB indices within the same DRS bursts.

If the obtained repetition indicator is "OFF", the UE may stop SSB detection within the DRS burst. Once the UE finishes this DRS burst, the UE may go to next DRS burst.

Figure 16:
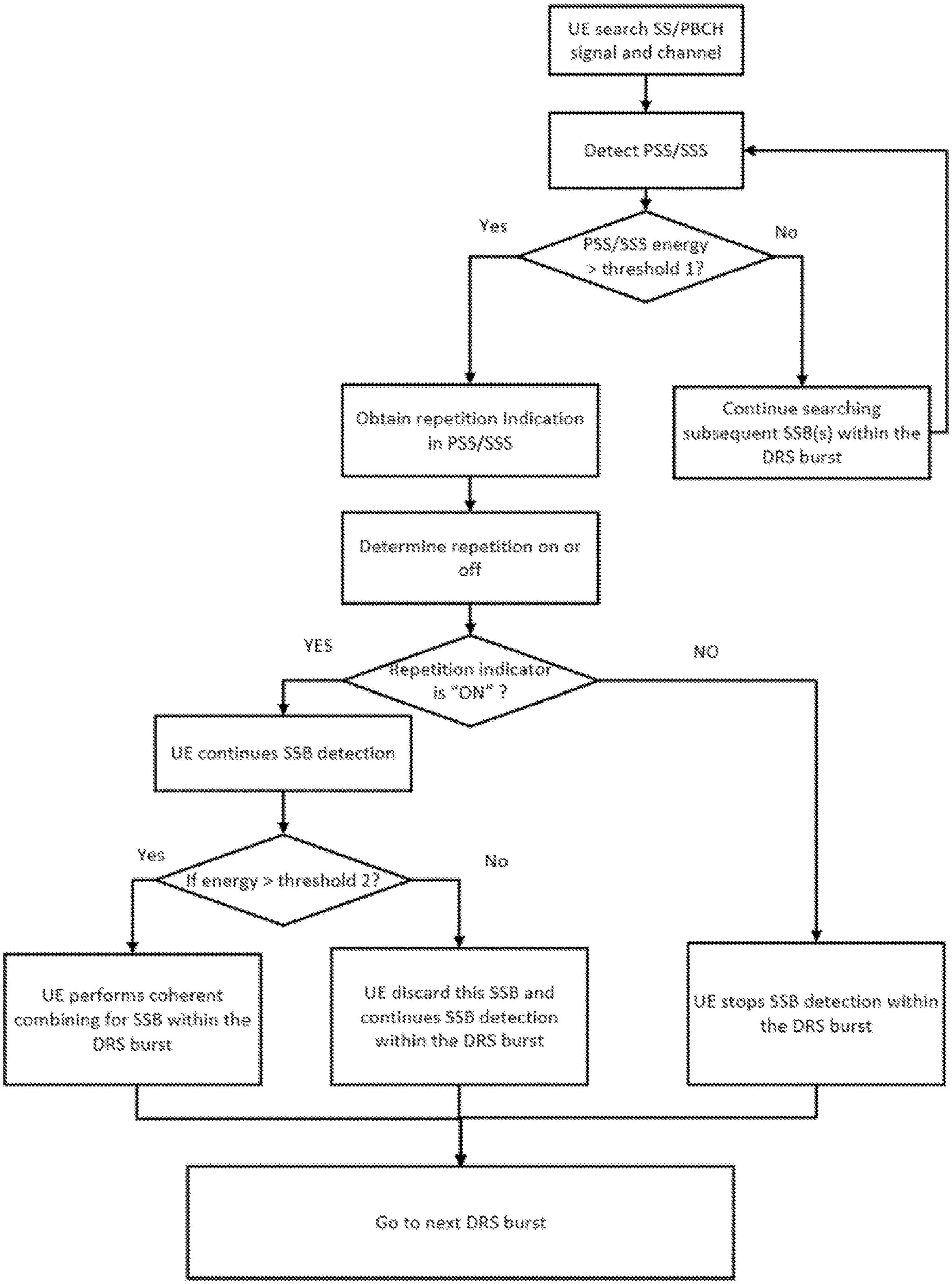
FIG. 16 shows an example of SSB Repetition Using Repetition Indicator in PSS and/or SSS with Additional Energy Detection.

Another example may be to carry a repetition indicator in SS such as PSS and/or SSS. The method of UE behavior when SSB Repetition Using Repetition Indicator in SS (PSS and/or SSS) is depicted in FIG. 16.

A UE may search SS/PBCH signal and channel. The UE may detect PSS/SSS and check PSS/SSS energy against a threshold. The threshold may be predefined, (pre-)configured or indicated. If received PSS/SSS energy is below the threshold, the UE may continue searching subsequent SSB (s) within the DRS burst and detecting PSS/SSS.

If received PSS/SSS energy is greater than the threshold, the UE may obtain the repetition indication in PSS/SSS. The UE may determine repetition "on" or "off" using different sets of PSS and/or SSS, or using different partitions of PSS and/or SSS. For example, one set or partition of PSS and/or SSS may indicate repetition "on". Another set or partition of PSS and/or SSS may indicate repetition "off". If the obtained repetition indicator is "ON", the UE may continue the SSB detection. The UE may perform coherent combining for SSB within the DRS burst.

If the obtained repetition indicator is "OFF", the UE may stop SSB detection within the DRS burst. Once the UE finishes the current DRS burst, the UE may go to next DRS burst.

The method of UE behavior when SSB Repetition Using Repetition Indicator in SS (PSS and/or SSS) with additional energy detection is depicted in FIG. 16.

A UE may search SS/PBCH signal and channel. The UE may detect PSS and/or SSS and check PSS/SSS energy against a threshold. The threshold may be predefined, (pre-) configured or indicated. If received PSS/SSS energy is below the threshold, the UE may continue searching subsequent SSB(s) within the DRS burst and detecting PSS/SSS.

If received PSS/SSS energy is greater than the threshold, the UE may obtain the repetition indication in PSS/SSS. The UE may determine repetition "ON" or "OFF". If the obtained repetition indicator is "ON", the UE may continue the SSB detection. The UE may perform coherent combining for SSB within the DRS burst.

The UE may further check the energy level. If the energy level is greater than a second threshold, the UE may perform coherent combining for the corresponding SSB within the DRS burst. If the energy level is not greater than a second threshold, the UE may skip and discard this SSB and continue SSB detection within the DRS burst. If the obtained repetition indicator is "OFF", the UE may stop SSB detection within the DRS burst. Once the UE finishes this DRS burst, the UE may go to next DRS burst.

Figure 17:
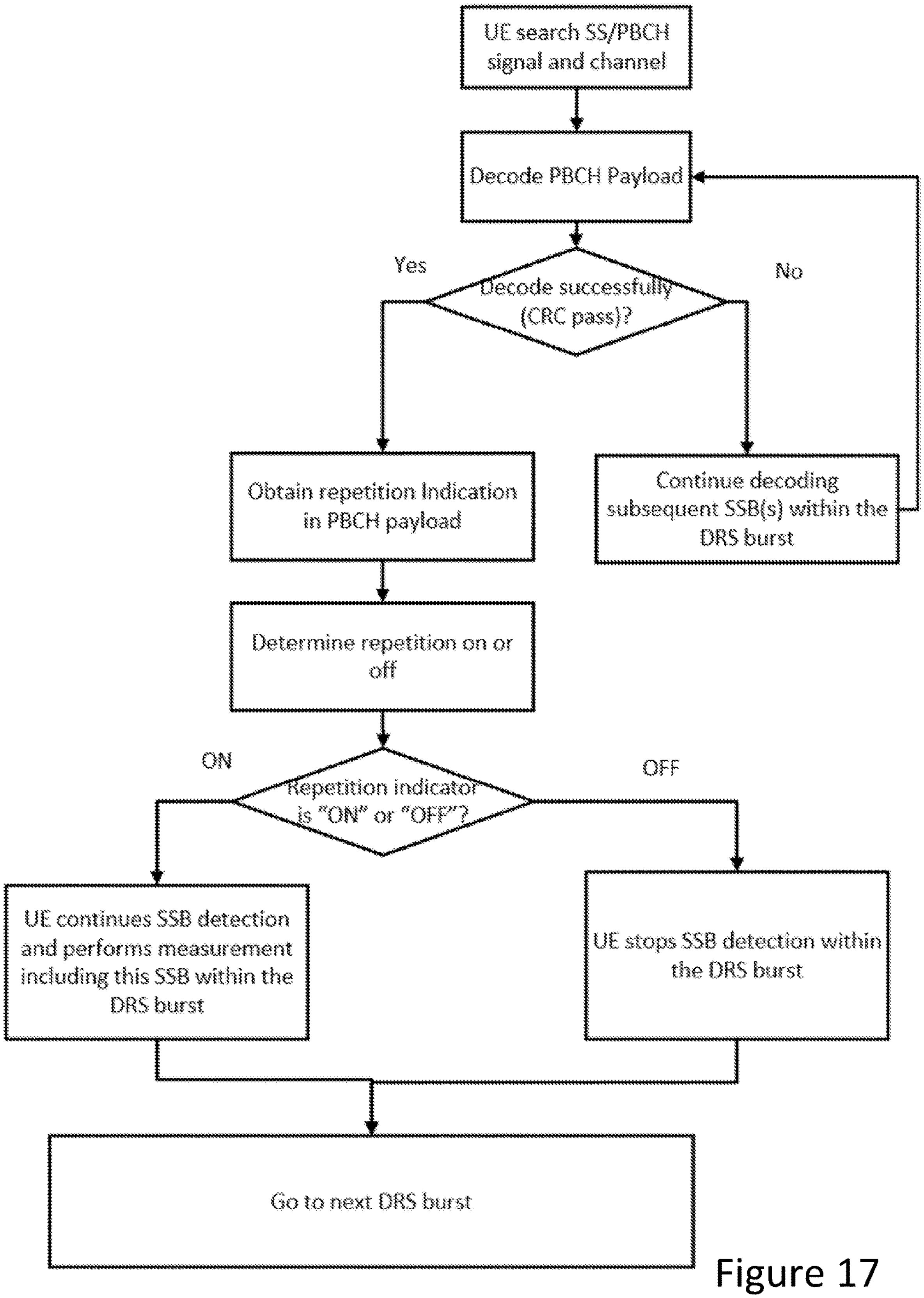
FIG. 17 shows an example of SSB Repetition Using Repetition Indicator in PBCH Payload.

Yet another example may be to carry a repetition indicator in a PBCH payload. The method of UE behavior when SSB Repetition Using Repetition Indicator in PBCH Payload is depicted in FIG. 17.

Figure 18:
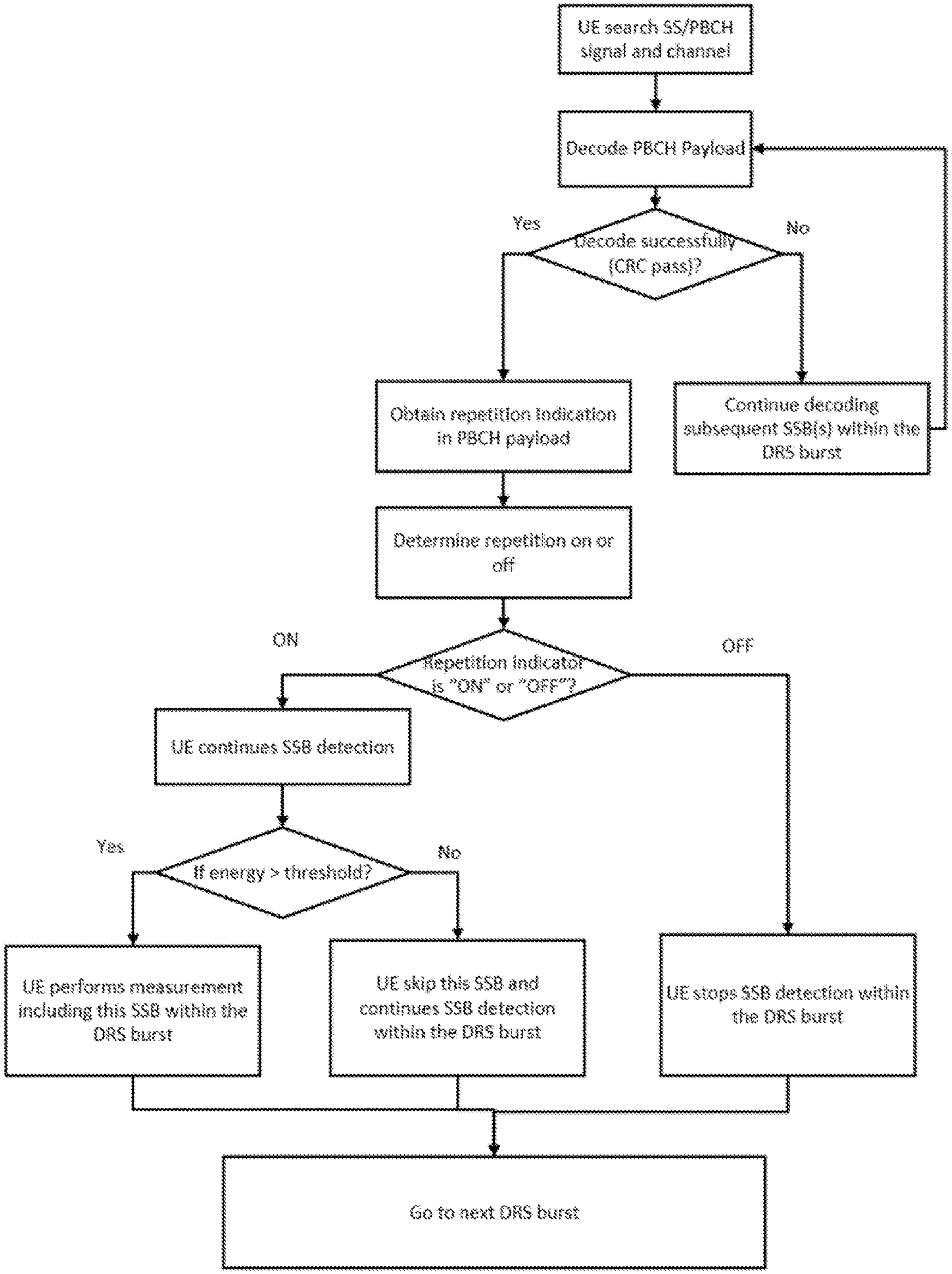
FIG. 18 shows an example of SSB Repetition Using Repetition Indicator in PBCH Payload (Energy Detection)

Another example may be to use a threshold to determine whether to include SSB in measurement processing. The method of UE behavior when SSB Repetition Using Repetition Indicator in PBCH Payload (Energy>Threshold) is depicted in FIG. 18.

In a higher frequency range depending on different numerologies such as SCSs which may be larger, DRS burst window duration and periodicity may be scaled down to be shorter in a time domain as compared to the legacy DRS burst window duration and periodicity in a lower frequency range with smaller SCSs for legacy NR frequency ranges. SSB may be transmitted per DRS burst and may be repeated across scaled down smaller DRS burst windows and periodicity without latency impact in comparison to the legacy NR system.

PDSCH Rate Matching

In this section, examples for more efficient rate matching are proposed for the frequency range from 52.6 GHz and above.

One example may be based on UE detection. A UE may detect the SSB. Before detecting the SSB, the UE may use all candidate SSB index for the same SSB index within the DRS burst for rate matching. The UE may not know whether the SSB is transmitted or not. Thus, the UE may use all possible SSS for rate matching. Once the UE detects a SSB and learns that repetition is "off", the UE knows that subsequent SSB will not be transmitted at all. In this case, the UE may have more information to optimize the rate matching. After SSB is detected, candidate SSB index for the same SSB index within DRS burst may be discarded for rate matching. Another example may use SSB transmission pattern or repetition pattern for rate matching purpose. Yet another example may use a bitmap for rate matching purpose. A QCL-based bitmap may be introduced. A pattern may be carried in a signal and/or channel, e.g., RMSI, RRC signaling, etc.

Figure 19:
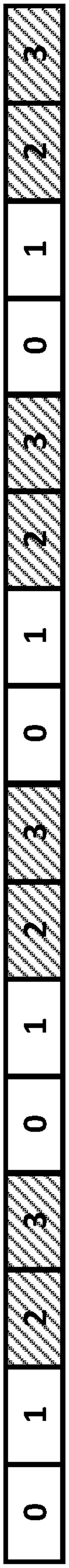
FIG. 19 shows an example of Rate Matching (Full)

Rate matching may consider all candidate SSBs which may be transmitted. Rate Matching (Full) is depicted in FIG. 19. Full rate matching may use all candidate SSB indexes indicated in ssb-PositionsInBurst. SSBs may or may not be transmitted. But all SSBs in the candidate SSB index indicated in ssb-PositionsInBurst may be used for rate matching at a UE. Each box represents an SSB. The number of each box represents SSB index. A shaded box represents a possible transmitted SSB. For example, SSBs with index 2 and 3 are transmitted within the same DRS burst. The first SSBs with index 2 and 3 are transmitted. The second, third and fourth SSBs with index 2 and 3 are assumed to be transmitted in the subsequent time locations. For full rate matching, the UE may assume that the SSB time locations in the shaded box are transmitted and thus occupied.

Figure 20:
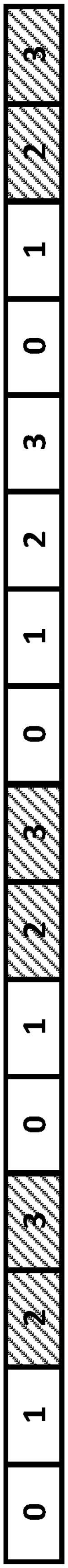
FIG. 20 shows an example of Rate Matching (Partial)

Rate matching may consider partial candidate SSBs which may be transmitted. Rate Matching (Partial) is depicted FIG. 20. A QCL-based bitmap may be used. Additional RM information with the QCL-based bitmap for SSBs #2 and 3 may be indicated as 1101. This implies that only the first, second and fourth pairs of SSB 2 and 3 are used for rate matching. For example, the first SSBs with index 2 and 3 are transmitted. The second and fourth SSBs with index 2 and 3 are assumed to be transmitted in the subsequent time locations. The third SSBs with index 2 and 3 are assumed not to be transmitted in the subsequent time locations. For partial rate matching, with the help of the indication of the QCL-based bitmap, the UE may assume that the SSB time locations in shaded boxes are transmitted and thus occupied, and those non-shaded boxes are not transmitted and thus not occupied for partial rate matching.

To reduce overhead, a same bitmap or a common bitmap applied to all SSB indices may be used. For more flexibility, one bitmap per SSB index or a group of SSB index may be used.

A UE may determine SSBs that are QCL-ed (same beam, same spatial domain filter) within the DRS burst using the following: For operation with a shared spectrum channel access, the UE may assume that SS/PBCH blocks in a serving cell that are within a same discovery burst transmission window or across discovery burst transmission windows are QCL-ed, if a value of $$\left(N_{DM-RS}^{PBCH} \bmod N_{SSB}^{QCL}\right)$$

is the same among the SS/PBCH blocks.

$$N_{DM-RS}^{PBCH}$$

is an index of a DM-RS sequence transmitted in a PBCH of a corresponding SS/PBCH block, and $$N_{SSB}^{QCL}$$

may either be provided by ssb-PositionQCL-r16 or obtained from a MIB provided by a SS/PBCH block. The UE may determine an SS/PBCH block index according to $$\left(N_{DM-RS}^{PBCH} \bmod N_{SSB}^{QCL}\right)$$

or according to $$\left(\bar{\imath} \bmod N_{SSB}^{QCL}\right)$$

where $\bar{\imath}$ is the candidate SS/PBCH block index.

What is claimed is:

1. A device comprising:

one or more processors; and memory storing instructions that, when executed by the one or more processors, cause the device to:

receive a synchronization signal block (SSB), the SSB comprising at least one of a synchronization signal (SS) or a physical broadcast channel (PBCH);

determine a first timing offset based on an SSB index associated with the SSB;

determine a half-frame indicator (HFI) associated with the PBCH;

determine assistance information associated with at least one of the SS or the PBCH, wherein the assistance information indicates a second timing offset; and determine, based at least in part on the first timing offset, the HFI, and the second timing offset, a total timing offset associated with a cell, wherein the second timing offset is applied to adjust a timing position determined based on the SSB index and the half-frame indicator.

2. The device of claim 1, wherein the total timing offset indicates one of a first quarter fraction of a radio frame, a second quarter fraction of the radio frame, a third quarter fraction of the radio frame, or a fourth quarter fraction of the radio frame.

3. The device of claim 1, wherein the total timing offset indicates one of a first eighth fraction of a radio frame, a second eighth fraction of the radio frame, a third eighth fraction of the radio frame, a fourth eighth fraction of the radio frame, a fifth eighth fraction of the radio frame, a sixth eighth fraction of the radio frame, a seventh eighth fraction of the radio frame, or an eighth eighth fraction of the radio frame.

4. The device of claim 1, wherein the HFI is determined based on at least one of a demodulation reference signal (DMRS) associated with the SSB or a payload associated with the SSB.

5. The device of claim 1, wherein the assistance information is determined based on at least one of a demodulation reference signal (DMRS) associated with the SSB or a payload associated with the SSB.

6. A method comprising:

generating, within a cell, a synchronization signal block (SSB) comprising at least one of a synchronization signal (SS) or a physical broadcast channel (PBCH), the SSB comprising:

a first timing offset associated with an SSB index associated with the SSB;

a half-frame indicator (HFI) associated with the PBCH; and assistance information associated with at least one of the SS or the PBCH, wherein the assistance information indicates a second timing offset;

sending the SSB; and receiving a request from a user equipment (UE) to synchronize, wherein the request to synchronize is based at least in part on a total timing offset based at least in part on the first timing offset, the HFI, and the second timing offset, wherein the second timing offset is applied to adjust a timing position determined based on the SSB index and the half-frame indicator.

7. The method of claim 6, wherein the total timing offset indicates one of a first quarter fraction of a radio frame, a second quarter fraction of the radio frame, a third quarter fraction of the radio frame, or a fourth quarter fraction of the radio frame.

8. The method of claim 6, wherein the total timing offset indicates one of a first eighth fraction of a radio frame, a second eighth fraction of the radio frame, a third eighth fraction of the radio frame, a fourth eighth fraction of the radio frame, a fifth eighth fraction of the radio frame, a sixth eighth fraction of the radio frame, a seventh eighth fraction of the radio frame, or an eighth eighth fraction of the radio frame.

9. The method of claim 6, wherein the HFI is associated with at least one of a demodulation reference signal (DMRS) associated with the SSB or a payload associated with the SSB.

10. The method of claim 6, wherein the assistance information is associated with at least one of a demodulation reference signal (DMRS) associated with the SSB or a payload associated with the SSB.

* * * * *